US009715718B2

(12) United States Patent
Ohba et al.

(10) Patent No.: US 9,715,718 B2
(45) Date of Patent: Jul. 25, 2017

(54) IMAGE PROCESSING DEVICE, IMAGE PROCESSING SYSTEM, IMAGE PROCESSING METHOD, AND COMPUTER PROGRAM FOR EFFECTING CHANGES IN A SELECTED DISPLAY REGION

(71) Applicant: Sony Computer Entertainment Inc., Tokyo (JP)

(72) Inventors: Akio Ohba, Kanagawa (JP); Hiroyuki Segawa, Kanagawa (JP); Tetsugo Inada, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 184 days.

(21) Appl. No.: 14/301,954

(22) Filed: Jun. 11, 2014

(65) Prior Publication Data

US 2014/0375694 A1    Dec. 25, 2014

(30) Foreign Application Priority Data

Jun. 21, 2013  (JP) .................................. 2013-131130

(51) Int. Cl.
*G06T 3/40*     (2006.01)
*G06F 3/00*    (2006.01)
*G06T 13/80*   (2011.01)

(52) U.S. Cl.
CPC ................. *G06T 3/40* (2013.01); *G06F 3/00* (2013.01); *G06T 13/80* (2013.01); *G06F 2203/04806* (2013.01)

(58) Field of Classification Search
CPC .............. G06T 3/40; G06T 13/80; G06F 3/00

(Continued)

(56) References Cited

U.S. PATENT DOCUMENTS 6,563,999 B1   5/2003  Suzuoki
7,209,149 B2 * 4/2007  Jogo ....................... G06T 11/60
                                                              345/619

(Continued)

FOREIGN PATENT DOCUMENTS

CN        102084327 A    6/2011
CN        102999261 A    3/2013

OTHER PUBLICATIONS

Office Action for corresponding CN Application No. 2014102641804, 25 pages, dated Feb. 6, 2017.

*Primary Examiner* — Jacinta M Crawford
*Assistant Examiner* — Terrell Robinson
(74) *Attorney, Agent, or Firm* — Matthew B. Dernier, Esq.

(57) ABSTRACT

An image processing device includes: an input information obtaining section for obtaining input information for changing a display region in an image as a display object; a display image processing section for generating an image inside the display region determined on a basis of the input information as a display image; and a display section for displaying the generated display image on a display, wherein when the input information obtaining section obtains input information for scaling the display image, the display image processing section scales the display image according to the input information, and performs image manipulation making visibility of a region in a predetermined range including a focus as a center of scaling in an image plane different from visibility of another region.

8 Claims, 13 Drawing Sheets

(58) Field of Classification Search
USPC .......................................................... 345/660
See application file for complete search history.

(56) References Cited

U.S. PATENT DOCUMENTS

| | | | |
|---|---|---|---|
| 8,873,886 B2 | 10/2014 | Fukazawa | |
| 2005/0134610 A1* | 6/2005 | Doyle | G06F 3/0481 |
| | | | 345/647 |
| 2005/0251015 A1* | 11/2005 | Takikawa | G06T 3/40 |
| | | | 600/407 |
| 2009/0219387 A1* | 9/2009 | Marman | G08B 13/19652 |
| | | | 348/143 |
| 2009/0225183 A1* | 9/2009 | Tamura | G06T 5/50 |
| | | | 348/222.1 |
| 2010/0053211 A1* | 3/2010 | Ingermanson | G06K 9/0014 |
| | | | 345/626 |
| 2011/0109581 A1 | 5/2011 | Ozawa | |
| 2013/0064473 A1 | 3/2013 | Fukazawa | |

\* cited by examiner

FIG.2
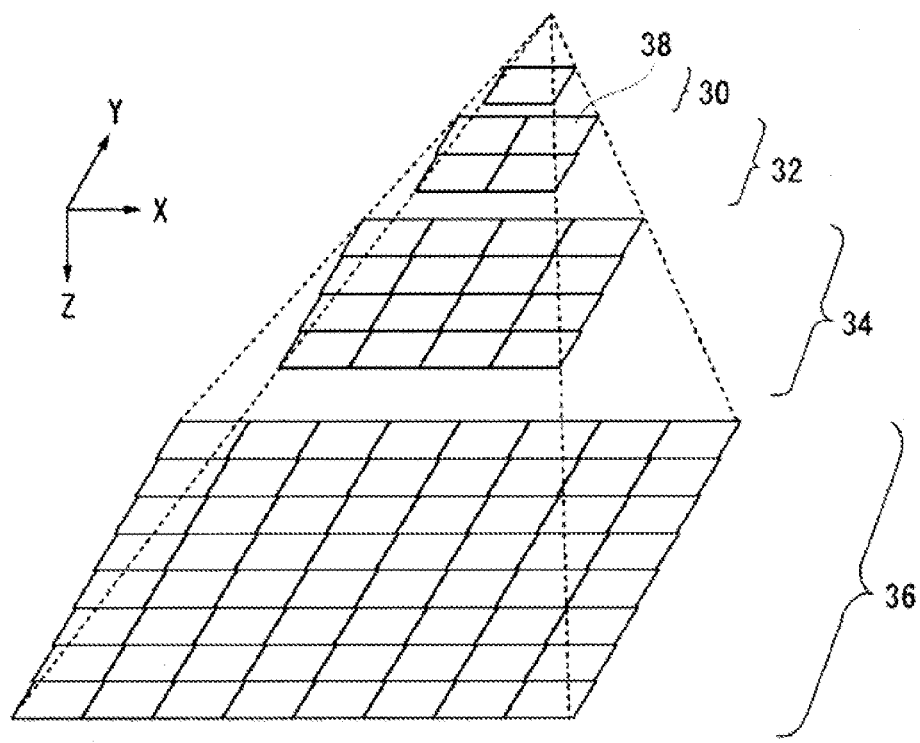
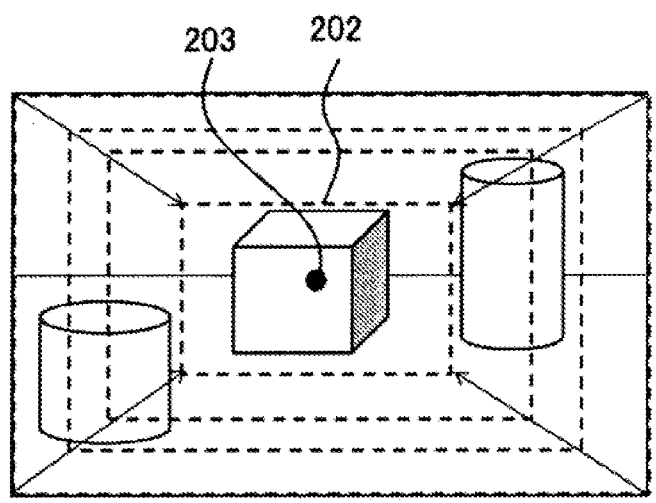
FIG.3

IMAGE PROCESSING DEVICE, IMAGE PROCESSING SYSTEM, IMAGE PROCESSING METHOD, AND COMPUTER PROGRAM FOR EFFECTING CHANGES IN A SELECTED DISPLAY REGION

BACKGROUND

The present technology relates to an image processing technology for updating a display image according to a user operation.

An entertainment system for home use has been proposed which can not only execute a game program but also reproduce a moving image. In the entertainment system for home use, a GPU (Graphics Processing Unit) generates a three-dimensional image using a polygon (see U.S. Pat. No. 6,563,999, for example).

SUMMARY

When such an image display technology realizes a display mode in which a display object image can be enlarged and reduced and a display region can be moved by scrolling, the display region is desirably changed continuously and smoothly. However, depending on various factors such as the data size of the image, the processing power of the display system, and the like, continuous display update processing in a period of moving the display region may not be performed in time, and thus there may be missing frames, for example, which may cause a viewer to have a feeling of strangeness.

The present technology has been made in view of such problems. It is desirable to provide an image processing technology capable of smoothly effecting changes in a display region which changes include enlargement and reduction.

A mode of the present technology relates to an image processing device. The image processing device includes: an input information obtaining section configured to obtain input information for changing a display region in an image as a display object; a display image processing section configured to generate an image inside the display region determined on a basis of the input information as a display image; and a display section configured to display the generated display image on a display, wherein when the input information obtaining section obtains input information for scaling the display image, the display image processing section scales the display image according to the input information, and performs image manipulation making visibility of a region in a predetermined range including a focus as a center of scaling in an image plane different from visibility of another region.

In this case, "making visibility different" according to a region is to make different the ease of viewing the display image, that is, a degree of detailedness with which to show the contour, shape, or motion of an object in the image. Specifically, making visibility different may be any of methods of rendering some masking object or a pattern or graphics having a masking effect in the whole or a part of a region to be decreased in visibility and methods of decreasing luminance, lightness, spatial resolution, or temporal resolution.

Another mode of the present technology relates to an image processing system. The image processing system includes: a client terminal operated by a user; and a server configured to obtain information about a user operation from the client terminal, generate data of a display image to be displayed on the client terminal according to the information, and transmit the data to the client terminal, wherein the server includes an input information obtaining section configured to obtain input information for changing a display region in an image as a display object from the client terminal, a display image processing section configured to generate an image inside the display region determined on a basis of the input information as the display image, an encoding section configured to compression-code data of the generated display image, and a transmitting section configured to transmit the compression-coded data to the client terminal; the client terminal includes a decoding section configured to decode and decompress the compression-coded data transmitted from the server, and a display section configured to display a decoded and decompressed image on a display; and in the server, when the input information obtaining section obtains input information for scaling the display image, the display image processing section changes the display image such that the scaling of the image is performed so as to be limited to a region in a predetermined range including a focus as a center of scaling in an image plane.

Yet another mode of the present technology relates to an image processing method. The image processing method is an image processing method for controlling an image displayed on a display by an image processing device, the image processing method including: obtaining input information for changing a display region in an image as a display object from an input device; generating an image inside the display region determined on a basis of the input information as a display image, and storing the display image in a memory; and reading the display image stored in the memory, and displaying the display image on the display, wherein when input information for scaling the display image is obtained in obtaining the input information from the input device, the display image is scaled according to the input information, and image manipulation making visibility of a region in a predetermined range including a focus as a center of scaling in an image plane different from visibility of another region is performed.

Yet another mode of the present technology also relates to an image processing method. The image processing method is performed by a client terminal operated by a user, and a server for obtaining information about a user operation from the client terminal, generating data of a display image to be displayed on the client terminal according to the information, and transmitting the data to the client terminal, the image processing method including: in the server, obtaining input information for changing a display region in an image as a display object from the client terminal; generating an image inside the display region determined on a basis of the input information as the display image, and storing the display image in a memory; reading data of the generated display image from the memory, and compression-coding the data of the generated display image; and transmitting the compression-coded data to the client terminal; and in the client terminal, decoding and decompressing the compression-coded data transmitted from the server, and storing the data in a memory; and reading a decoded and decompressed image from the memory, and displaying the image on a display; wherein when the server obtains input information for scaling the display image in obtaining the input information from the client terminal, the display image is changed such that the scaling of the image is performed so as to be limited to a region in a predetermined range including a focus as a center of scaling in an image plane.

Yet another mode of the present technology also relates to a computer program. The computer program makes a computer realize: a function of obtaining input information for changing a display region in an image as a display object from an input device; a function of generating an image inside the display region determined on a basis of the input information as a display image; and a function of displaying the generated display image on a display, wherein when the function of obtaining the input information from the input device obtains input information for scaling the display image, the function of generating the image as the display image scales the display image according to the input information, and performs image manipulation making visibility of a region in a predetermined range including a focus as a center of scaling in an image plane different from visibility of another region.

Yet another mode of the present technology also relates to a computer program. The computer program makes a server for obtaining information about a user operation from a client terminal connected via a network, generating data of a display image to be displayed on the client terminal according to the information, and transmitting the data to the client terminal realize: a function of obtaining input information for changing a display region in an image as a display object from the client terminal; a function of generating an image inside the display region determined on a basis of the input information as the display image; a function of compression-coding data of the generated display image; and a function of transmitting the compression-coded data to the client terminal, wherein when the function of obtaining the input information from the client terminal obtains input information for scaling the display image, the function of generating the image as the display image changes the display image such that the scaling of the image is performed so as to be limited to a region in a predetermined range including a focus as a center of scaling in an image plane.

It is to be noted that arbitrary combinations of the above constituent elements as well as methods, devices, systems, computer programs, and the like into which expressions of the present technology are converted are also effective as modes of the present technology.

According to the present technology, a display image can be changed smoothly irrespective of a display environment and conditions.

BRIEF DESCRIPTION OF THE DRAWINGS

FIG. 2 is a conceptual diagram of the hierarchical structure of image data usable in the present embodiment;

FIG. 3 is a diagram of assistance in explaining a scaling operation on a display image in the present embodiment;

DETAILED DESCRIPTION OF THE PREFERRED EMBODIMENTS

First Embodiment

Figure 1:
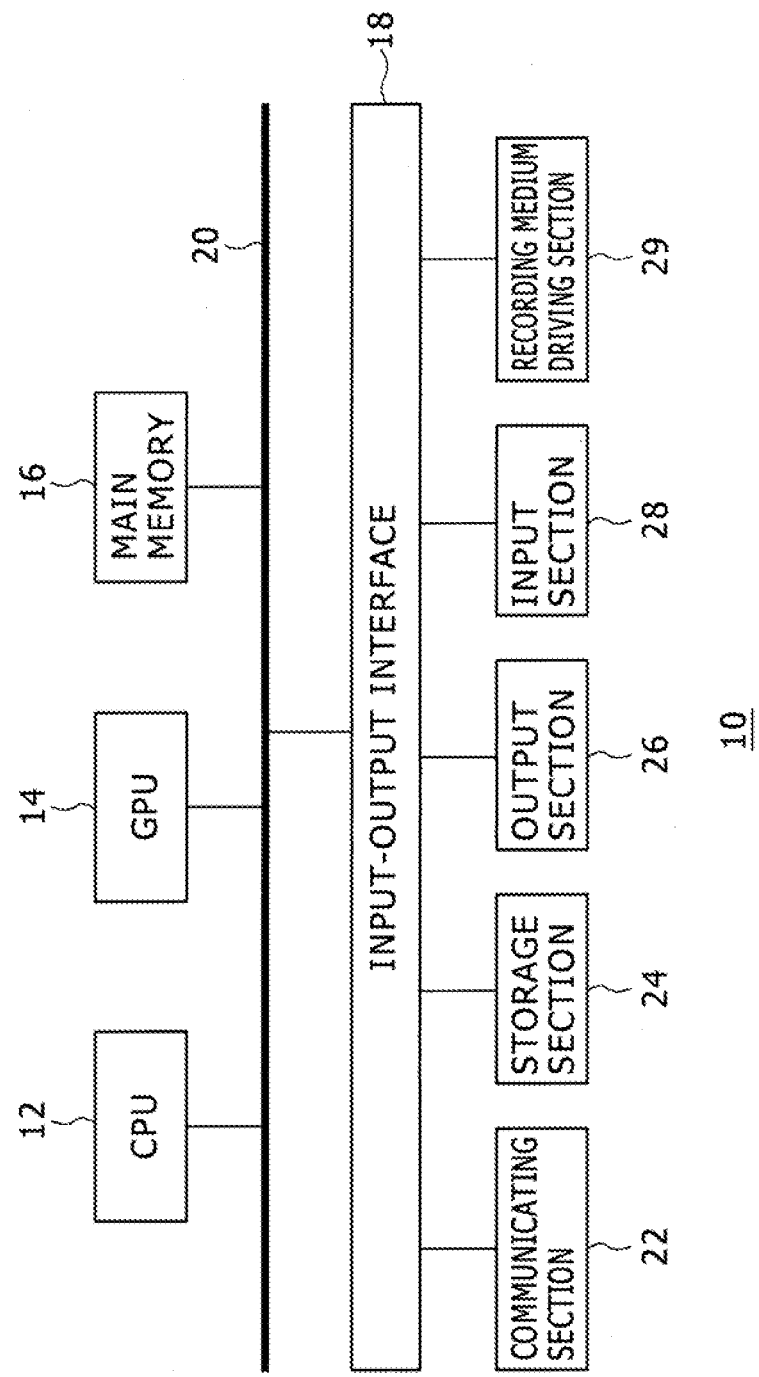
FIG. 1 is a diagram showing an internal circuit configuration of an information processing device in a present embodiment.

FIG. 1 shows an internal circuit configuration of an information processing device in a present embodiment. The information processing device 10 includes a CPU (Central Processing Unit) 12, a GPU 14, and a main memory 16. The CPU 12 controls processing in constituent elements within the information processing device 10 and signal transmission on the basis of programs such as an operating system, an application, and the like. The GPU 14 performs image processing. The main memory 16 is formed by a RAM (Random Access Memory). The main memory 16 stores a program and data necessary for processing.

These parts are interconnected via a bus 20. The bus 20 is further connected with an input-output interface 18. The input-output interface 18 is connected with: a communicating section 22 including a peripheral device interface such as USB (Universal Serial Bus), IEEE1394, or the like and a network interface of a wired or wireless LAN (Local Area Network); a storage section 24 such as a hard disk drive, a nonvolatile memory, or the like; an output section 26 for outputting image and audio data; an input section 28 for receiving input from the outside such as a user or the like; and a recording medium driving section 29 for driving a removable recording medium such as a magnetic disk, an optical disk, a semiconductor memory, or the like.

The CPU 12 controls the whole of the information processing device 10 by executing the operating system stored in the storage section 24. The CPU 12 also executes various kinds of programs read from the storage section 24 and the removable recording medium and loaded into the main memory 16 or downloaded via the communicating section 22. The GPU 14 has a function of a geometry engine and a function of a rendering processor. The GPU 14 performs rendering processing according to a rendering instruction from the CPU 12, and stores a display image in a frame buffer not shown in the figure. Then, the GPU 14 converts the display image stored in the frame buffer into a video signal, and outputs the video signal to the output section 26.

The input section 28 includes ordinary input devices such as a keyboard, a touch pad, buttons, a joystick, a microphone, a camera, and the like and a mechanism for obtaining input signals from the input devices. The output section 26 includes ordinary output devices such as a display for displaying an image, a speaker for outputting audio, and the like and a mechanism for sending out an output signal to the output devices. Incidentally, the present embodiment focuses on image processing technology. Thus, hereinafter, audio output will not be mentioned. However, audio may be output together with image display as required.

The information processing device 10, the input devices included in the input section 28, and the display included in the output section 26 may have respective separate casings, and may be connected to each other by a wire cable. Alternatively, wireless connection may be established between the information processing device 10, the input devices included in the input section 28, and the display included in the output section 26 by using a Bluetooth (registered trademark) protocol, an IEEE802.11 protocol, or the like. Alternatively, a device having an integral casing may be formed within which the information processing device 10, the input devices included in the input section 28, and the display included in the output section 26 are connected to each other. For example, a portable game machine, a tablet terminal, an advanced portable telephone, or the like may be realized by disposing a display in a surface of a casing, and providing a touch pad on the front surface as an input device.

The information processing device 10 according to the present embodiment at least has functions of enlarging/reducing (hereinafter referred to simply as "scaling") a display image and scrolling the display image in an upward-downward direction or a left-right direction according to user operations. Thus, changing a region displayed on the display in an image as a display object may hereinafter be referred to collectively as "moving a display region."

In the present embodiment, the data of an image set as a display object is not particularly limited. However, the following description will be made of for example image data having a hierarchical structure including images of different resolutions which images are generated by reducing an original image in a plurality of stages. In such image data, the image in each layer is divided into one or a plurality of tile images. For example, an image of a lowest resolution is formed by one tile image, and the original image of a highest resolution is formed by a largest number of tile images. At a time of image display, tile images used for rendering are changed to tile images in a different layer when the display image is changed to a predetermined resolution. This enables enlarged display or reduced display to be made quickly.

FIG. 2 is a conceptual diagram of image data having such a hierarchical structure. The image data has a hierarchical structure including a zeroth layer 30, a first layer 32, a second layer 34, and a third layer 36 in a direction of depth (Z-axis). Incidentally, while only the four layers are shown in FIG. 2, the number of layers is not limited to this. The image data having such a hierarchical structure will hereinafter be referred to as "hierarchical data."

The hierarchical data shown in FIG. 2 has a quadtree hierarchical structure. Each layer is formed by one or more tile images 38. All of the tile images 38 are formed in an identical size having a same number of pixels, and for example have 256×256 pixels. Image data in each layer represents one image with a different resolution. Image data in the second layer 34, the first layer 32, and the zeroth layer 30 is generated by reducing the original image having the highest resolution in the third layer 36 in a plurality of stages. For example, the resolution of an Nth layer (N is an integer of zero or more) may be ½ of the resolution of an (N+1)th layer in both of the left-right (X-axis) direction and the upward-downward (Y-axis) direction.

In the information processing device 10, the hierarchical data is retained in the storage section 24 in a state of being compressed in a predetermined compression format, and is read from the storage section 24 and decoded before being displayed on the display. The information processing device 10 according to the present embodiment has a decoding function supporting a plurality of kinds of compression formats, and is capable of decoding compressed data in an S3TC format, a JPEG format, and a JPEG2000 format.

In the hierarchical structure of the hierarchical data, as shown in FIG. 2, the left-right direction is set as an X-axis, the upward-downward direction is set as a Y-axis, and the depth direction is set as a Z-axis, and a virtual three-dimensional space is constructed. After the information processing device 10 derives an amount of change in the display region on the basis of a display region moving request signal supplied from an input device, the information processing device 10 sequentially derives the coordinates of four corners of a frame (frame coordinates) in the virtual space using the amount of change. Incidentally, in place of the frame coordinates in the virtual space, the information processing device 10 may derive information identifying a layer and texture coordinates (UV coordinates) in the layer. Hereinafter, a combination of the layer identifying information and the texture coordinates will also be referred to as frame coordinates.

The data of an image set as a display object in the present embodiment may be hierarchical data as described above, or may have another structure. In addition, the display object may be not only a still image but also a moving image. Moving images may have the data structure of an ordinary moving image obtained by arranging image frames in order of time series, or may have a hierarchical structure. The latter is a structure in which hierarchical data as shown in FIG. 2 is created for each image frame, and the hierarchical data is arranged in order of time series. Incidentally, in the subsequent description, an image inside a region to be displayed, which is determined by the frame coordinates, among these display object images, that is, an image in a region to be displayed on the display will be referred to as a "display image."

When a display region moving operation is performed while an image is displayed, the compression-coded data of a region to be newly displayed needs to be read out from the storage section 24 into the main memory 16, and subjected to decoding and decompression processing. In the case of the hierarchical data, for example, when the layer of data used for display is changed according to a scaling operation, the data of tile images in a layer after the change needs to be decoded and decompressed again. In addition, when motion compensation is used for compression coding of a moving image, change components that may not be predicted by a motion vector are increased at the time of a scaling operation, so that the generation of the display image may take time as compared with scrolling.

Therefore, a measure needs to be taken by for example limiting a speed at which the display region is moved or speculatively reading and decoding the image data of a region other than the display region or a region predicted to be displayed. However, as image display of higher functionality and higher quality is intended to be achieved by increasing the definition of the display image or increasing the number of layers, processing necessary before the display image is updated, such as reading, decoding, decompressing processing on new image data tends to be increased. As a result, there is an increased possibility that a response time from an operation to the updating of the display image becomes longer or display is stopped temporarily or made continually in a process of moving the display region.

Accordingly, the present embodiment reduces processing cost and ensures responsiveness by selectively outputting information desired during display image scaling operation, in which operation such problems tend to be noticeable. FIG. 3 is a diagram of assistance in explaining a scaling operation on the display image. First, an image 200 represents the whole of an image as a display object, or an image in a display region as a starting point of an enlarging operation. The image 200 shows two circular cylinders and a cube on a stand, for example.

When an operation of enlarging a region around a position 203 in the center of a screen is performed while such an image is displayed, the display region changes as indicated by a broken line rectangle, and becomes a final display region 202 when the enlarging operation is ended. In FIG. 3, changes in the four corners of the display region are indicated by respective arrows. Opposite changes are made in a case of a reducing operation. Incidentally, the position 203 as the center of the scaling operation in the display image will hereinafter be referred to as a "focus" of the scaling operation.

Figure 4:
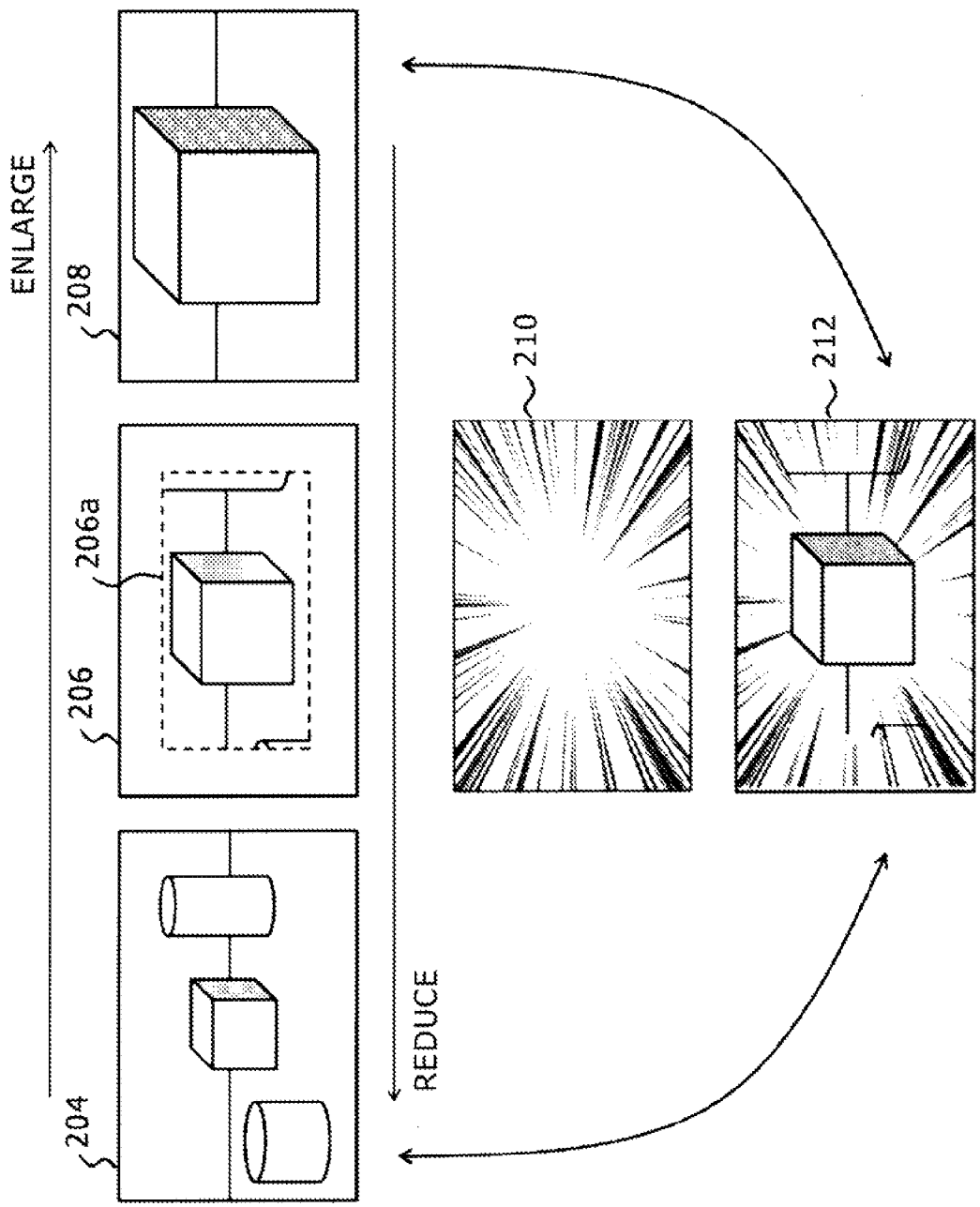
FIG. 4 is a diagram showing an example of changes in a screen displayed at the time of the scaling operation in the present embodiment.

FIG. 4 shows an example of changes in the screen displayed in the present embodiment in response to the operation shown in FIG. 3. First, a screen 204 represents the display image at the starting point in FIG. 3. In a case where the display image is enlarged to display a screen 208 showing a display image at an end point, a mask image 210 prepared separately is synthesized in a period of the enlarging processing. As shown in FIG. 4, the mask image 210 includes a plurality of lines concentrating from the periphery of the screen onto the center of the screen as the focus of the enlarging operation, that is, a so-called concentration line.

Meanwhile, as for the display image being enlarged, a part of the display region within the broken line rectangle shown in FIG. 3, that is, a region 206a in a predetermined range having the focus of the enlarging operation as a center, as in a display image 206 in FIG. 4, is set as an update object. The region 206a set as the update object according to the scaling operation will hereinafter be referred to as an update region. Incidentally, FIG. 4 shows an image in only the update region 206a in the display image 206 being enlarged. The image of the corresponding region in the image of the screen 204 as the starting point may be left as it is in the other region, or the other region may be a region filled in with a single color such as white or the like. In any case, changes are made such that the image within the update region in the display image is enlarged.

A screen in which the image being enlarged in the update region is present in the center of the concentration line is formed by synthesizing the thus changing display image and the mask image 210 with each other by alpha blending processing. As a result, the screen displayed in the enlarging operation changes from the screen 204 to a screen 212 to the screen 208, for example.

At the time of the synthesis, the whole of the mask image 210 may be translucent, or the region corresponding to the update region may be transparent or translucent and the other region may be opaque. In the former case, the transmittance of the region corresponding to the update region may be higher than that of the other region. On the other hand, the region other than the update region in the display image 206 may be transparent or translucent, and the update region may be opaque or have a lower transmittance than the other region. In addition, in regard to each of the images, when the transmittance of the image is changed within the image, continuity between the update region and the other region is desirably obtained in the images after the synthesis by setting the transmittance of the image to make a continuous change at the boundary of the update region. In the case of the reducing operation, the screen 208 is conversely the starting point and is changed to the screen 212 and then to the screen 204. However, the configuration of the screen in the reducing process is similar to that in the enlarging operation.

A movement in a direction of depth of an object and the concentration of the viewpoint of a viewer can be expressed by drawing radial lines in such a manner as to converge to one vanishing point such as the concentration line of the mask image 210. By synthesizing this mask image 210 with the image being enlarged or being reduced, the position as the focus of the scaling operation, or the part of the cube in FIG. 4 can be made clear, and a state of the scaling operation being performed can be expressed explicitly and naturally.

As in a case of looking in a traveling direction while riding a high-speed vehicle, in general, the viewer performing the scaling operation views the image while concentrating more on the focus of the enlarging/reducing changes as the operating speed of the scaling operation is increased. In addition, when the image is scaled, a region closer to the focus makes a smaller change. Utilizing such characteristics, the present embodiment reduces processing cost and improves responsiveness by limiting the region set as an update object in the display region to the focus and the vicinity thereof. At the same time, the screen is easy for the viewer to view because complex movements in other than the region of interest do not come into view.

Incidentally, the introduction of the concentration line into the mask image can be said to be suitable for the scaling operation from a viewpoint of being able to grasp a movement in the direction perpendicular to the image plane intuitively. However, an image of other than the concentration line may be the mask image as long as the image can differentiate the visibility of the update region from that of the other region. That is, the image prepared as the mask image is not particularly limited as long as a state in which the device is performing the scaling processing can be shown clearly and the scaling movement corresponding to the operation is clearly visible in a partial region at least around the focus in the image and visibility can be relatively lowered in the other region. For example, images of clouds, particles, concentric circles, concentric rectangles, frames, and the like may be used. Alternatively, an image itself may be subjected to some manipulation by for example applying a motion blur in the direction of the concentration line to the image as the starting point of operation or the like or lowering the luminance of the region other than the update region or blurring the region other than the update region.

Figure 5:
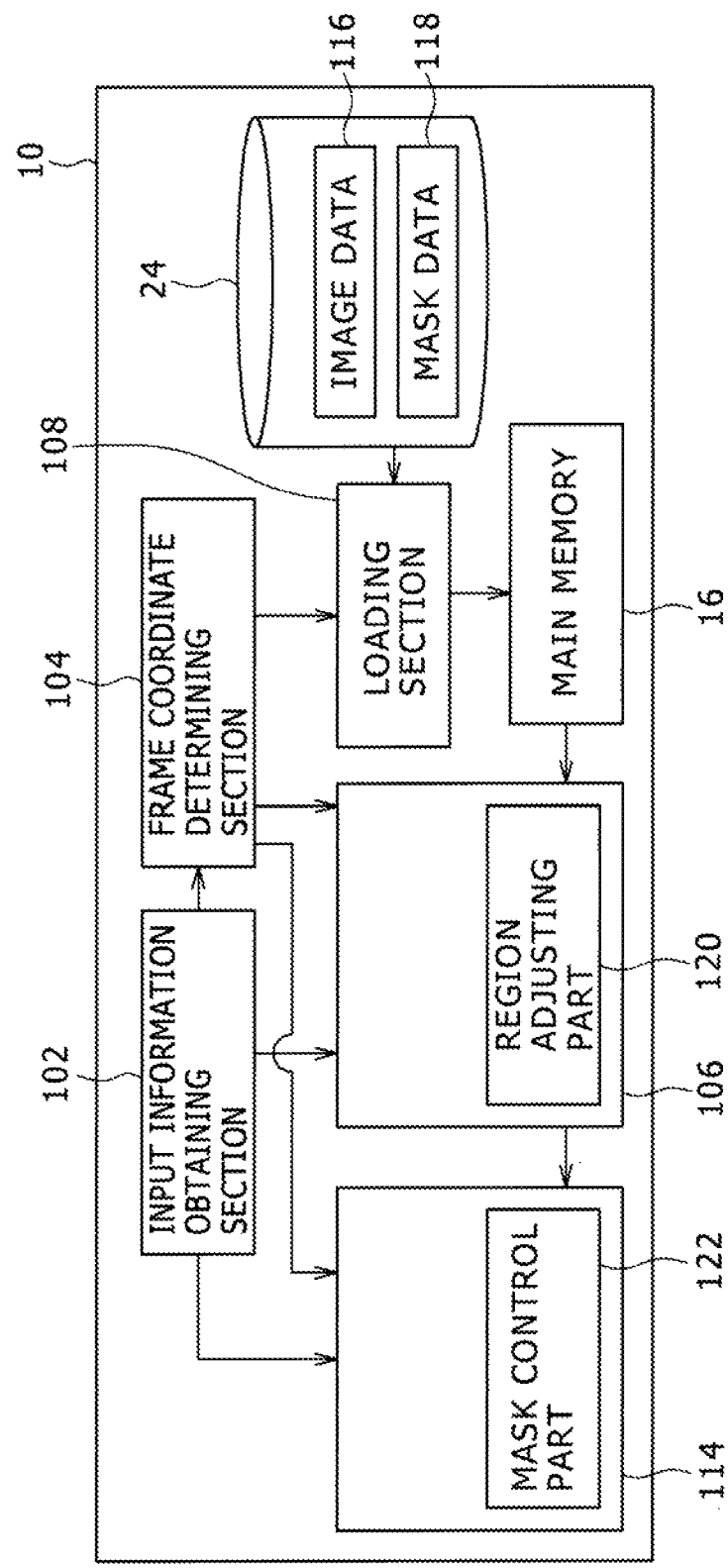
FIG. 5 is a diagram showing in detail a functional configuration of the information processing device in the present embodiment.

FIG. 5 shows in detail a functional configuration of the information processing device 10. Each functional block shown in FIG. 5 and FIGS. 11 and 13 to be described later can be implemented, in terms of hardware, by the configuration of the CPU and the GPU shown in FIG. 1, a RAM, various kinds of processors, and the like, and is implemented, in terms of software, by a program exerting various functions such as an image processing function, an arithmetic function, a data access function, and the like, which program is loaded from a recording medium or the like into a memory. Hence, it is to be understood by those skilled in the art that these functional blocks can be implemented in various forms by only hardware, only software, or combinations of hardware and software, and are not to be limited to any one of the forms.

The information processing device 10 includes: an input information obtaining section 102 for obtaining information about an operation performed on the input device by the user; a frame coordinate determining section 104 for successively determining the frame coordinates of a region to be displayed in an image being displayed according to the user operation; a loading section 108 for loading data necessary for image display from the storage section 24; a decoding section 106 for decoding and decompressing the compressed image data; and a display image processing section 114 for rendering a display image.

In addition, the storage section 24 stores image data 116, which is the compression-coded data of a display object image, and mask data 118, which is the compression-coded data of a mask image. Incidentally, various kinds of programs for operating the information processing device 10 and necessary data may be stored in the storage section 24 and loaded into the main memory 16 as appropriate. However, the various kinds of programs and the necessary data are not shown in FIG. 5.

The input information obtaining section 102 obtains information about details of operation via the input device operated by the user. Specifically, the input information obtaining section 102 obtains information indicating a selection of an application program to be started or an image to be displayed, a request to move the display region, or the like. Incidentally, the information processing device 10 may perform not only processing for image display, display region movement, and the like, but also ordinary information processing involving image display for a game, a web browser, communications, and the like. The information obtained by the input information obtaining section 102 may also be various information depending on the details of the processing. In addition, the display region may be moved not only according to a user operation but also by the device itself as a result of such information processing.

However, in the subsequent description, attention will be directed to the movement of the display region according to a user operation as an embodiment. Therefore, while FIG. 5 shows only functions relating to the corresponding mode, basic processing is common including other functions. The frame coordinate determining section 104 determines the frame coordinates of the display region in each subsequent time step from the frame coordinates of the present display region and a moving speed vector based on an input display region moving request. Here, a "time step" is display image update timing based on a frame rate. The determined frame coordinates are notified to the loading section 108, the decoding section 106, and the display image processing section 114.

The loading section 108 checks whether or not there is compressed image data to be loaded from the storage section 24 into the main memory 16 on the basis of the frame coordinates notified from the frame coordinate determining section 104. The loading section 108 loads the compressed image data as required. In a case where hierarchical data as shown in FIG. 2 is used, for example, the layer necessary for display and the data of tile images in the layer are identified. When there is data not loaded in the main memory 16, the data is loaded. Incidentally, the loading section 108 may predict data that will subsequently become necessary as appropriate on the basis of changes thus far in the display region, the present display region, and the like, and load the data in advance. Depending on the size of the image and the capacity of the main memory 16, all of the image data may be loaded.

The loading section 108 further loads the mask data 118 from the storage section 24 into the main memory 16 at the time of a start of image display, the time of a start of an application program involving such display, or the like. The decoding section 106 decodes and decompresses data in a region necessary for display which data is included in the compressed image data loaded in the main memory 16 on the basis of the frame coordinates notified from the frame coordinate determining section 104. The decoding section 106 stores the data in an internal buffer memory. Decoding and decompressing image data in a wide range and storing the image data in the buffer memory in advance can reduce the number of times of readout from the main memory 16, and thus realize smooth movement of the display region.

The decoding section 106 internally includes a region adjusting part 120. The region adjusting part 120 receives a notification indicating timing of a start and an end of a display image scaling operation from the input information obtaining section 102 in the timing of the start and the end of the display image scaling operation, and determines the update region to be updated during the scaling operation. Supposing that the frame coordinates notified from the frame coordinate determining section 104 indicate the frame of the display image 206 in FIG. 4, the region adjusting part 120 determines the update region 206a within the frame of the display image 206. The update region determined in this case is a rectangular region in a predetermined range having the focus of the scaling operation as a center, as described above. In addition, as will be described later, particularly when a scaling speed determined from an operation amount of the scaling operation is changed temporally, for example, the size of the update region may also be changed temporally.

The decoding section 106 at least decodes and decompresses the data of the thus determined update region and stores the data of the update region in the buffer memory in advance. That is, even when there are no resources to spare for processing necessary in updating the display image depending on the processing power of the information processing device 10, the capacity of the buffer memory, the user operation performed thus far, the data size of the display object image, and the like, a state in which at least the image of the update region can be updated is provided. This enables image display robust against changes in such conditions.

More simply, as described above, data decoding and decompression is performed to update only the image in the update region at all times. On the other hand, processing may be prioritized such that the data of the update region is preferentially decoded and decompressed and thereafter the data of the periphery of the update region is decoded and decompressed. Incidentally, it suffices to set a region indicated by the frame coordinates notified from the frame coordinate determining section 104 as the update region as it is in a period of other than the scaling operation.

In addition, the decoding section 106 decodes and decompresses the mask data 118 loaded in the main memory 16 and separately stores the mask data 118 in the buffer memory at the time of a start of image display, the time of a start of an application program involving such display, or the like. The display image processing section 114 renders a display image in an internal frame buffer using the image data stored in the buffer memory of the decoding section 106 on the basis of the frame coordinates notified from the frame coordinate determining section 104, and displays the display image on the display in appropriate timing.

The display image processing section 114 internally includes a mask control part 122. At the time of the scaling operation, the data of an image updated from a previous time step according to the scaling operation is stored at least for the update region in the buffer memory of the decoding section 106. Thus, the display image processing section 114 reads the data of the image and renders the data of the image in the frame buffer on the basis of the frame coordinates notified from the frame coordinate determining section 104.

Meanwhile, the mask control part 122 receives the notification indicating the timing of the start and the end of the display image scaling operation from the input information obtaining section 102 in the timing of the start and the end of the display image scaling operation, and synthesizes a mask image with the display image rendered in the frame buffer using the mask data after being decoded and decompressed which mask data is read from the decoding section 106. The display image processing section 114 displays an image after the synthesis on the display. An image such as the screen 212 in FIG. 4 is thereby displayed in the scaling operation period.

Description will next be made of relation between the operation amount of scaling operation, scaling speed, and the size of the update region. At the time of the scaling operation, the user can control the scaling speed, that is, an amount of movement of a frame coordinate per unit time by adjusting the operation amount of the scaling operation. There are various methods for adjusting the operation amount depending on an input unit. For example, when the scaling operation is realized by an analog stick provided to an input device, the operation amount is adjusted by an angle of inclination of the analog stick. When scaling is realized by a change in an interval between an index finger and a thumb in contact with a touch pad, or a so-called pinch-in or pinch-out operation, the operation amount is adjusted by the speed of the fingers.

The frame coordinate determining section 104 determines the speed vector of the frame coordinate on the basis of the operation amount, and accordingly calculates a new frame coordinate for each time step. In this case, when the frame coordinate is moved at a speed proportional to the operation amount immediately after a start of the scaling operation, the display region may change suddenly and scaling more than is intended in the operation may be performed, or the updating of the display image may be delayed and the display image may change discontinuously.

Figure 6:
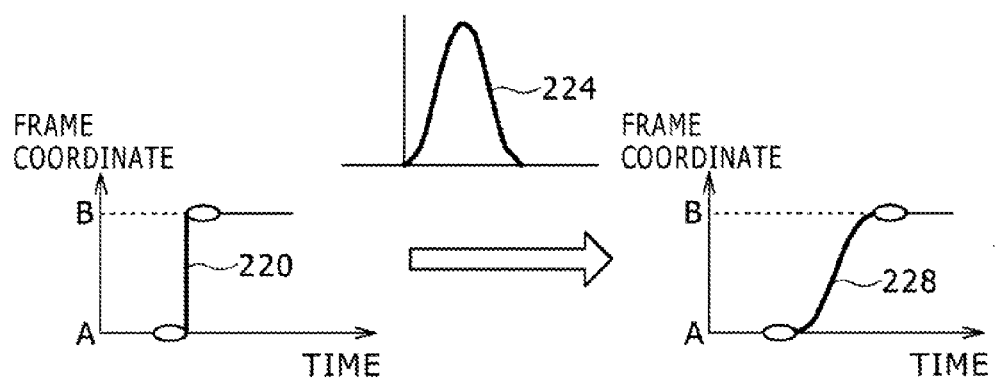
FIG. 6 is a diagram of assistance in explaining changes in scaling speed in the present embodiment.

Accordingly, the frame coordinate determining section 104 changes the scaling speed gently by performing convolution operation on a rectangular wave signal indicating a requested operation amount, which rectangular wave signal is obtained from the input device, and a predetermined transfer function. In this case, the transfer function may be a Gaussian function. FIG. 6 is a diagram of assistance in explaining changes in the scaling speed at this time. In FIG. 6, a temporal change 220 represents an input signal from the input device, and indicates that a scaling operation for moving the frame coordinate from coordinate A to coordinate B is performed. Incidentally, because frame coordinates are the coordinates of the four corners of the display region, the frame coordinate is actually constituted of four coordinates. However, as shown in FIG. 3, the four coordinates are always interlocked so as to constitute the four corners of a rectangle having the aspect ratio of the display. Therefore, the scaling speed can be defined by the movement of one of the coordinates.

Performing the convolution operation on the input signal with the Gaussian function 224 provides an actual temporal change 228 of the frame coordinate. Specifically, a movement is started at coordinate A as a starting point at a gentle speed, which speed is gradually increased to a maximum speed at an intermediate point, and is thereafter gradually decreased, and the movement ends at coordinate B. A maximum value of the Gaussian function 224 defining the maximum speed is determined as appropriate according to actual changes in the display image, the processing power, and the like. In particular, the maximum value of the Gaussian function 224 is determined such that display update processing is performed in time at the intermediate point at which the maximum speed is reached.

Figure 7:
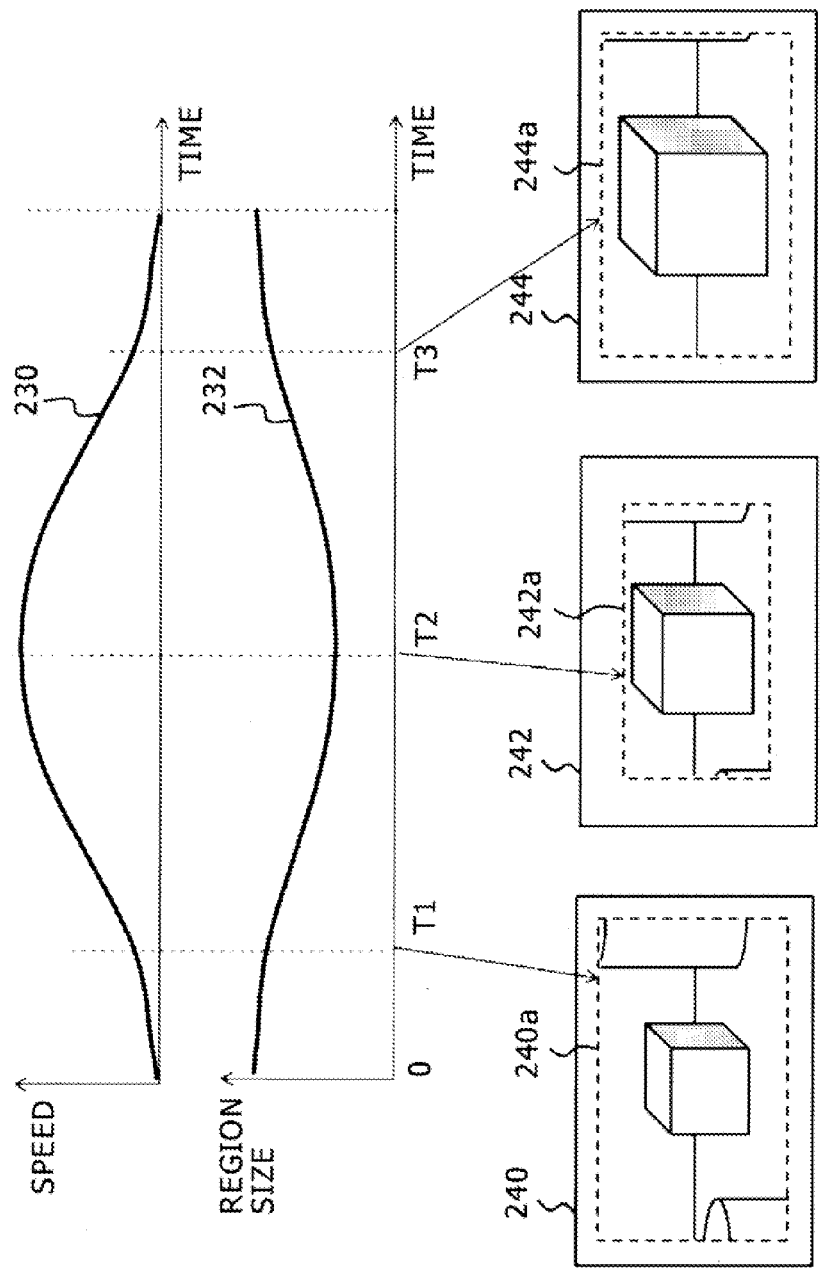
FIG. 7 is a diagram of assistance in explaining relation between the scaling speed and the size of an update region in the present embodiment.

FIG. 7 is a diagram of assistance in explaining relation between the scaling speed and the size of the update region. The top row of FIG. 7 shows changes in the moving speed of the frame coordinate. The middle row of FIG. 7 shows changes in the size of the update region in accordance with the changes in the moving speed of the frame coordinate. An axis of abscissas indicates the passage of time. Suppose that scaling processing is started at time 0, and that the processing is ended, that is, an image as an end point is displayed at time T. As described with reference to FIG. 6, by performing convolution operation on the signal of the scaling operation with a Gaussian function or the like, the moving speed 230 of the frame coordinate is basically changed so as to be low immediately after a start of the scaling processing and immediately before an end of the scaling processing and be maximized at the intermediate point of the processing. Incidentally, the moving speed of the frame coordinate is actually changed also according to the duration of the operation and changes in the operation amount during the duration of the operation.

For such changes in the scaling speed, as shown in FIG. 7, the region adjusting part 120 determines the update region such that the higher the scaling speed, the smaller the size 232 of the update region. Incidentally, changes in the size 232 of the update region shown in FIG. 7 are an example. There may be various conversion equations for calculating the region size from the scaling speed as long as conditions as described above are satisfied qualitatively. For example, the region size may be inversely proportional to the scaling speed, or an amount of decrease from the size of the entire display region may be proportional to the scaling speed. In addition, the region size may be the length of one side or an area.

In any case, as shown in the bottom row of FIG. 7, the update region in display images 240, 242, and 244 before mask image synthesis at representative times T1, T2, and T3 in the scaling operation period has sizes such as those of update regions 240a, 242a, and 244a, respectively. That is, the update region 242a at time T2 at which the highest scaling speed is reached is smaller than the update regions 240a and 244a at the other times T1 and T3. Incidentally, as described above, an image immediately before the operation may be left as it is in the other region by excluding the other region from the update object, or the other region may be a filled-in region. In addition, FIG. 7 assumes an enlarging operation, in which the image within the update regions 240a, 242a, and 244a is enlarged with the passage of time. In a reducing operation, the image within the update region is reduced, of course.

Thus, decreasing the size of the update region as the scaling speed is increased reduces processing necessary to update the display image, and therefore makes it easy to avoid a situation in which update processing may not be performed in time for the scaling speed. In addition, as described above, the characteristics of a human that reduces the region of interest with the focus as a center as the scaling speed is increased match actual screen changes. Thus, display that is natural and easy to view is made for the viewer.

Figure 8:
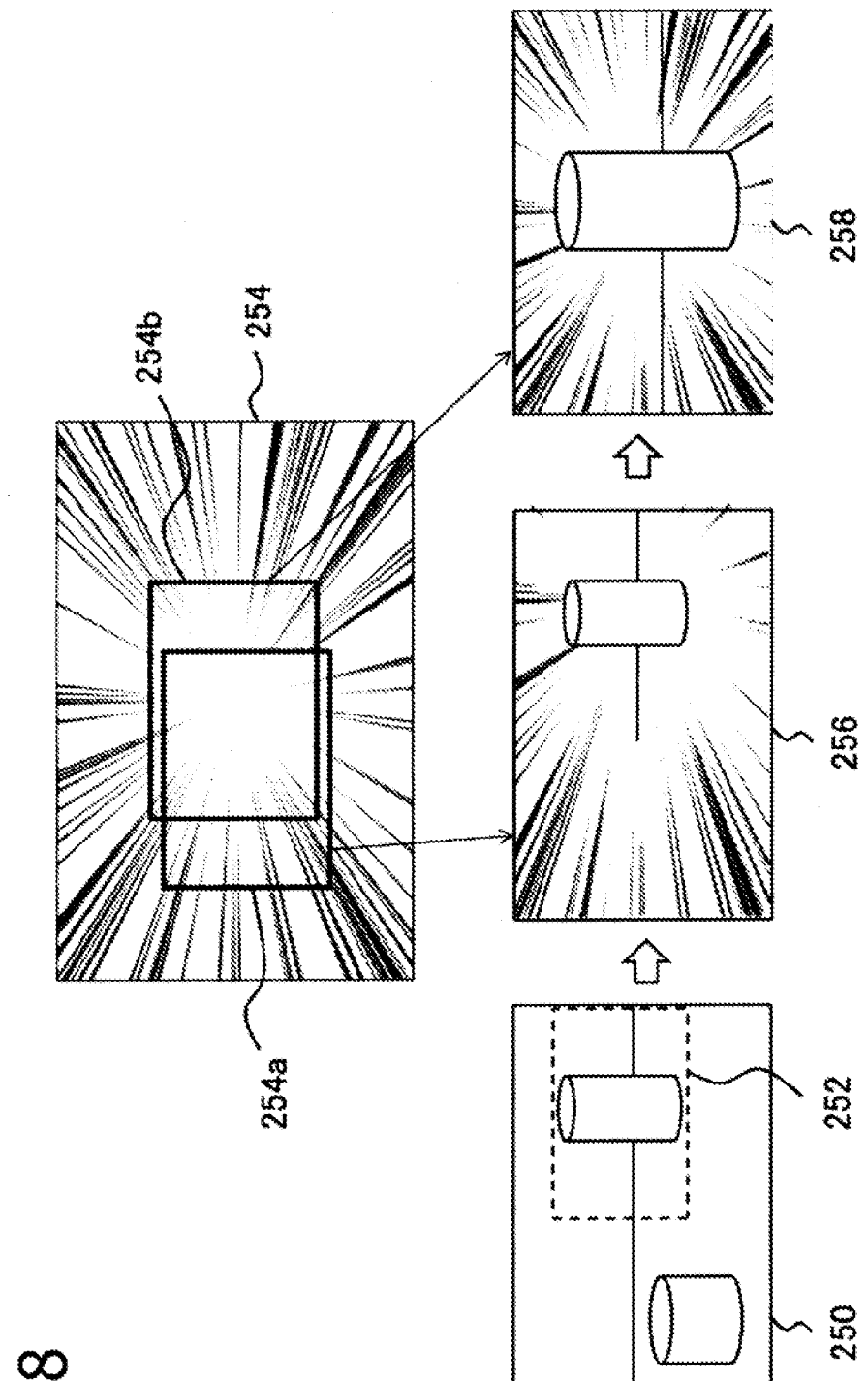
FIG. 8 is a diagram of assistance in explaining a method for generating a display image in a case where the focus of an enlarging operation is not the center of a screen in the present embodiment.

In the mode described thus far, the center of the screen is set as the focus of the scaling operation. However, a scroll and a scaling operation may be received simultaneously as in a case where a position other than the center of the screen is enlarged, or reduction is performed with the position as a center. In this case, the focus of the scaling operation moves from the position of a starting point to the center of the screen. Therefore, the center of the update region is also moved together with the focus of the scaling operation. Further, the mask image needs to be changed such that the concentration line converges to the focus at all times. FIG. 8 is a diagram of assistance in explaining a method for generating a display image in a case where the focus of an enlarging operation is not the center of the screen.

First, suppose that an operation of enlarging a region 252 is performed while an image 250 is displayed. As shown in FIG. 8, the region 252 is located to the upper right of the image 250. In a case of allowing scaling operation in which the center of the screen is thus not set as the focus, the data of a mask image 254 having a larger size than the size of the screen is prepared. Then, a mask image is cut out such that a point to which the concentration line converges is located at the position of the focus of the scaling operation within the screen. The cut-out region 254a is synthesized with the display image being enlarged to display a screen 256. At this time, the center of the update region is determined so as to be the focus of the enlarging operation. The size of the update region may be changed in a similar manner to that described with reference to FIG. 7.

As the enlarging processing progresses, the focus of the enlarging operation gradually moves to the center of the screen. The cut-out region of the mask image and the update region are also moved correspondingly. Then, at an end point of the enlarging operation, the focus is located at the center of the screen. Thus, a mask image is cut out such that the point to which the concentration line converges is located at the center. The cut-out region 254b is synthesized with an image as the end point to thereby display a screen 258. Thus, even when the focus of the enlarging operation is not located at the center of the screen, the position to which the concentration line converges can be easily adjusted to the focus. Also in a case of a reducing operation, the disposition of the update region and the cut-out region of the mask image are similarly changed according to the position of the focus.

Figure 9:
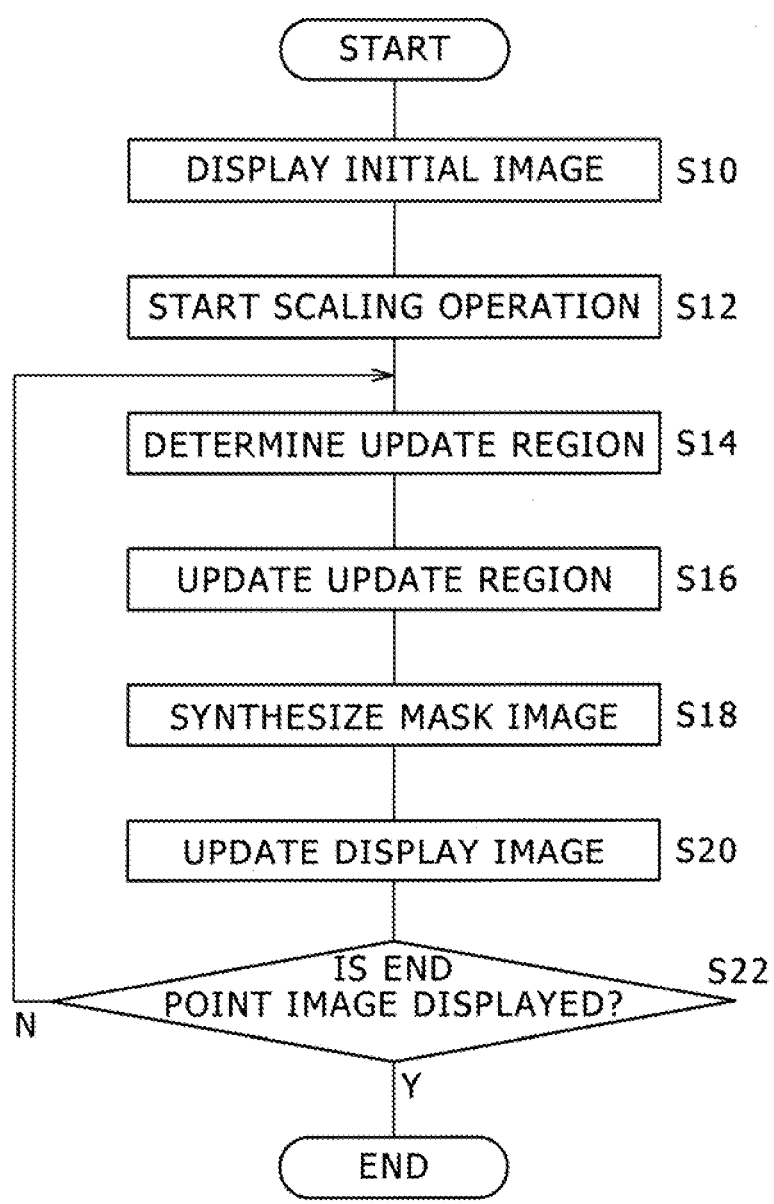
FIG. 9 is a flowchart of a process procedure in which the information processing device updates a display image according to a scaling operation in the present embodiment.

The operation of the information processing device that can be realized by the above configuration will next be described. FIG. 9 is a flowchart of a processing procedure for the information processing device 10 to update a display image according to a scaling operation. This flowchart is started when the user requests the information processing device 10 to start display processing together with a selection of contents or an image to be displayed. Incidentally, the information processing device 10 may perform processing other than display image scaling processing as appropriate according to a user operation, the progress of content output processing, and the like. However, the processing other than the display image scaling processing is omitted in the present flowchart.

When the user has performed an input for selecting contents or an image, the information processing device 10 displays an initial image using the image data 116 according to the selection, by cooperation between the loading section 108, the decoding section 106, the display image processing section 114, and the like (S10). When a moving image is displayed as the initial image, the display of an image frame is updated in each time step based on the frame rate. In addition, irrespective of whether the initial image is a still image or a moving image, the display is updated as appropriate according to a user operation, the progress of the contents, and the like. Incidentally, at this time, the mask data 118 is also decoded and decompressed, and stored in the buffer memory within the decoding section 106, the internal memory of the mask control part 122, or the like. The mask data 118 or the data of a mask image after being decoded may be retained within the mask control part 122 in advance.

When the user performs a display image scaling operation in such conditions (S12), the region adjusting part 120 in the decoding section 106 obtains a notification to that effect and information about an operation amount from the input information obtaining section 102, and determines an update region in a display region indicated by the frame coordinates notified from the frame coordinate determining section 104 (S14). Specifically, the region adjusting part 120 determines the size of the update region from a scaling speed corresponding to the operation amount, and determines the position of the update region such that the focus of the scaling operation is the center of the update region. The decoding section 106 reads at least the data of an image within the update region from the main memory 16, decodes and decompresses the data, and stores the data in the buffer memory. When the image data is hierarchical data, the layer of the decoded data is changed as appropriate according to the scaling operation.

Next, the display image processing section 114 updates the data of the update region in the internal frame buffer by enlarging or reducing at least the image within the update region by an amount corresponding to one time step according to the scaling operation, and drawing the enlarged or reduced image in a corresponding region in the frame buffer (S16). Next, the mask control part 122 in the display image processing section 114 synthesizes the mask image with the image stored in the frame buffer (S18). At this time, as described above, by performing alpha blending with only the update region in the mask image made translucent, for example, the scaling of the image in the update region is shown clearly, and the other region is concealed.

The display image processing section 114 converts a thus generated display image into a video signal, and sequentially sends out the video signal in appropriate timing, thereby updating the display image on the display device (S20). The image in which at least the image in the update region is scaled according to the scaling operation is displayed by repeating the processing from S14 to S20 until an image as an end point according to the scaling operation is displayed (N in S22 and S14 to S20). Then, after the image as the end point is displayed, the scaling processing is ended (Y in S22).

Incidentally, in the flowchart of FIG. 9, the mask image is synthesized for the first time in S18 after the update region is limited and updated in S14 and S16 at the start of the scaling processing. On the other hand, the mask image may be synthesized and displayed with the image being displayed at a point in time immediately after the scaling operation is started in S12, and the processing of scaling the image in the update region may be thereafter started. In this case, the scaling speed immediately after the scaling operation and immediately before the display of the end point image may be even slower than is determined from the convolution operation on the operation amount as shown in FIG. 7. In any case, by immediately displaying the mask image, good responsiveness of the device to the scaling operation can be produced irrespective of the processing power of the information processing device, the detail level of the image, and the like.

According to the present embodiment described above, the mask image of the concentration line or the like is synthesized while the image is scaled during the period that the display image scaling operation is performed. Thereby, information desired by the user such for example as information indicating that the scaling processing is being performed and indicating the focus of the scaling can be presented with good responsiveness. The concentration line used as the mask image can provide the user with a sense of bringing the viewpoint closer to or away from an object to which the concentration line converges, and thus has a strong affinity for image enlarging and reducing processing.

In addition, synthesizing the mask image eliminates a need to accurately scale and display the region distant from the focus. Thus, the region distant from the focus can be excluded from the object of scaling processing, or given a lower priority in the processing. As a result, processing cost in the scaling processing can be lowered, and the scaling processing can be carried out with stable responsiveness irrespective of the power of the information processing device, the type of the image, data structure, definition, and the like. At the same time, image display that is easy to view and simple can be realized by intentionally reducing an amount of information in a part to which the user is not paying attention.

Second Embodiment

In the first embodiment, description has been made of a mode in which one information processing device displays image data retained by the information processing device itself and performs scaling processing within the information processing device. In the present embodiment, description will be made of a mode in which a server retains a part or all of display object image data, and transmits necessary data to a client terminal in real time via a network according to a user operation in the client terminal, whereby the client terminal makes display according to the operation.

Figure 10:
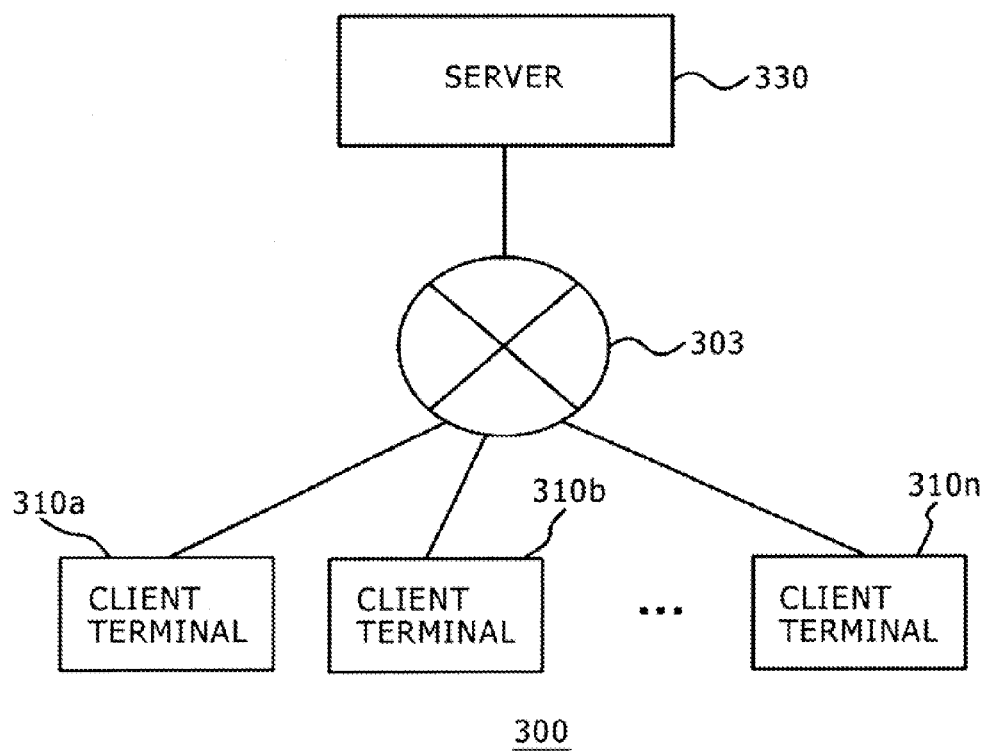
FIG. 10 is a diagram showing a configuration of an information processing system in the present embodiment.

FIG. 10 shows a configuration of an information processing system in the present embodiment. Client terminals 310a, 310b, ..., 310n in the information processing system 300 are each configured to be connectable to a server 330 via a network 303 to transmit and receive data to and from the server 330. The server 330 performs information processing according to a request from the client terminals 310a, 310b, ..., 310n, and transmits output data generated as a result of the information processing to the client terminals 310a, 310b, ..., 310n. The client terminals 310a, 310b, ..., 310n and the server 330 are connected to the network 303 by wire or by radio. An ordinary technology can be applied to a method for connecting the client terminals 310a, 310b, ..., 310n and the server 330 to each other, requests for information processing, and a procedure relating to the transmission and reception of the output data.

The client terminals 310a, 310b, ..., 310n are devices operated by respective users. The client terminals 310a, 310b, ..., 310n transmit operations performed by the users as input information to the server 330, and request information processing according to the operations. Then, the client terminals 310a, 310b, ..., 310n receive output data generated as a result of the server 330 performing the information processing, and output the output data as images and audio. The client terminals 310a, 310b, ..., 310n may be any ordinary device or terminal, such as a tablet, a portable telephone, a portable terminal, a personal computer, or the like. Incidentally, the number of client terminals 310a, 310b, ..., 310n and servers 330 connected to the network 303 is not particularly limited. The client terminals 310a, 310b, ..., 310n will hereinafter be referred to collectively as a client terminal 310.

Incidentally, the details of the processing performed by the server 330 according to a request from the client terminal 310 are not particularly limited, but may be processing for displaying a specified still image or a specified moving image, or may be any ordinary information processing for a game, calculation, data creation, and the like. In any case, the server 330 performs processing according to a user operation on the client terminal 310 in real time, and successively transmits output data such as an image, audio, or the like generated according to the user operation to the client terminal 310.

Figure 11:
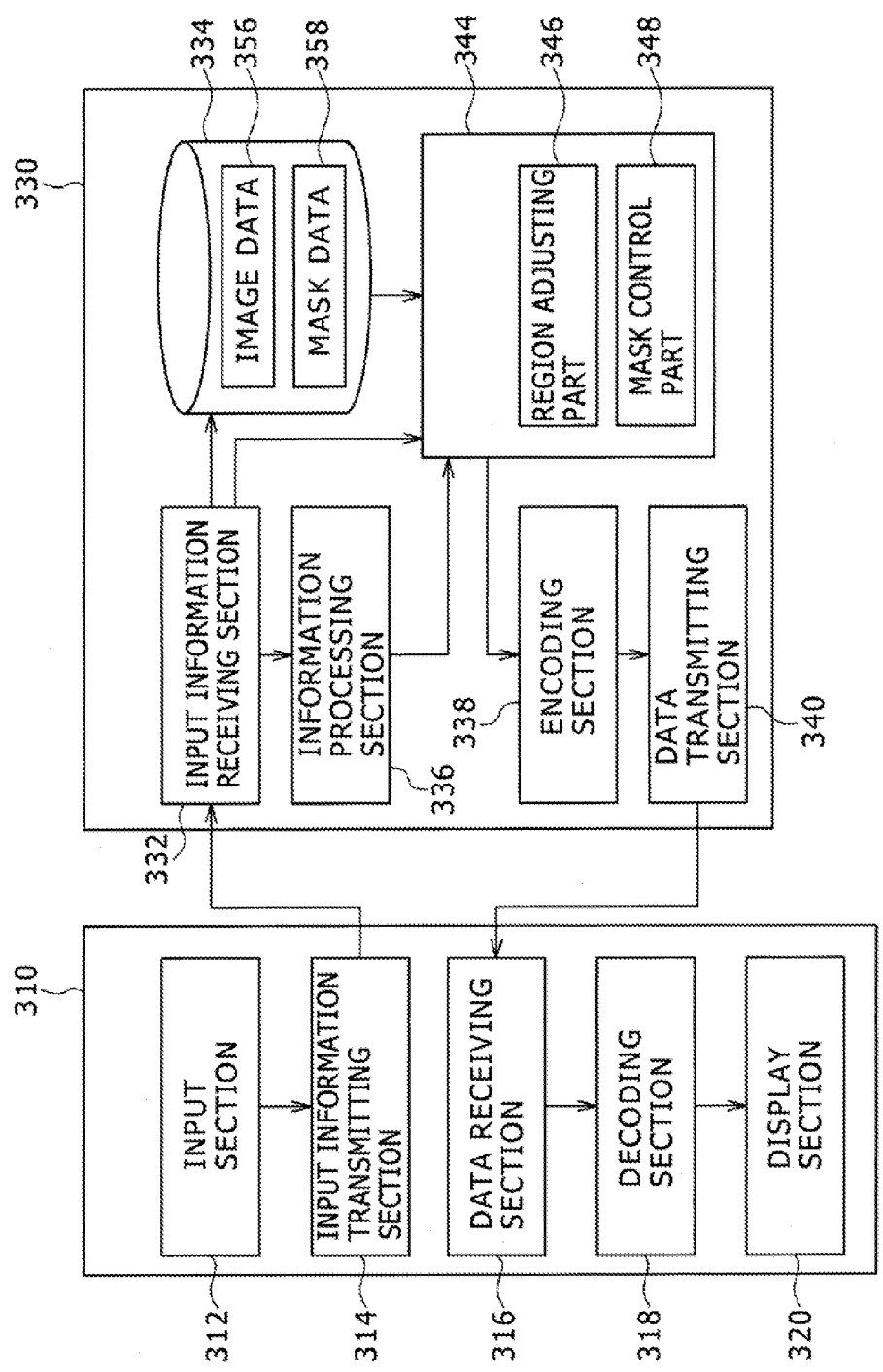
FIG. 11 is a diagram showing a functional configuration of a client terminal and a server in the present embodiment.

The client terminal 310 and the server 330 have a circuit configuration similar to that of the information processing device 10 described with reference to FIG. 1 in the first embodiment. FIG. 11 shows functional configurations of the client terminal 310 and the server 330. The client terminal 310 includes: an input section 312 for receiving a user operation; an input information transmitting section 314 for transmitting details of the received operation as input information to the server 330; a data receiving section 316 for receiving image data transmitted from the server 330; a decoding section 318 for decoding the image data; and a display section 320 for displaying an image.

The server 330 includes: an input information receiving section 332 for receiving the input information input by the user from the client terminal 310; an information processing section 336 for performing information processing requested from the client terminal 310; an image generating section 344 for generating an image to be displayed as a result of the information processing; an encoding section 338 for compression-coding the data of the generated display image; and a data transmitting section 340 for transmitting the compression-coded image data to the client terminal 310.

The server 330 further includes a storage section 334 storing image data 356 as the compression-coded data of a display object image and mask data 358 as the compression-coded data of a mask image. The storage section 334 corresponds to the storage section 24 in FIG. 1 and FIG. 5. Various kinds of programs for operating the server 330 and necessary data may be stored in the storage section 334 and loaded into a main memory or the like as appropriate. However, the various kinds of programs and the necessary data are not shown in FIG. 11.

The input section 312 in the client terminal 310 is an input unit for the user to specify the display object image and details of information processing to be performed, and input various kinds of commands including display image scaling operation. The input section 312 can be realized by at least one of ordinary input devices such as a gamepad, buttons, a touch panel, a keyboard, a mouse, a joystick, and the like. The input information transmitting section 314 establishes communication with the server 330 by an ordinary method, generates a signal of input information indicating details of a user operation on the input section 312, and transmits the signal to the server 330.

The input information receiving section 332 in the server 330 receives the input information transmitted from the client terminal 310. The information processing section 336 performs information processing according to the input information received by the input information receiving section 332. As described above, the input information is successively transmitted from the client terminal 310, and the information processing section 336 makes the information processing progress in real time according to the input information. The instant transmission of the input information from the input information transmitting section 314 in the client terminal 310 to the input information receiving section 332 and to the information processing section 336 in the server 330 enables the information processing to be performed as if the information processing were performed within the client terminal 310.

An ordinary emulation technology can be applied to a concrete protocol, the format of the input signal, an interpreting method therefor, and the like, and therefore description will be omitted here. The image generating section 344 generates an image to be displayed as a result of processing according to a request from the information processing section 336. When the information processing requested by the client terminal 310 is processing for displaying a specified image and changing the display region of the image according to a user operation, the information processing section 336 performs processing corresponding to that of the frame coordinate determining section 104 in the information processing device 10 in the first embodiment, and the image generating section 344 performs processing corresponding to that of the loading section 108, the decoding section 106, and the display image processing section 114.

Specifically, the image generating section 344 loads compressed image data to be loaded from the storage section 334 into an internal memory on the basis of frame coordinates notified from the information processing section 336, thereafter decodes and decompresses the compressed image data, and stores the image data in an internal buffer memory. Then, the image generating section 344 generates the image of a region to be displayed finally using the data, and supplies the image to the encoding section 338. On the other hand, when the information processing performed by the information processing section 336 is for a game or the like, the image generating section 344 may for example render an image by a computer graphics technology using model data, texture data, and the like stored in the storage section 334 under control of the information processing section 336.

The image generating section 344 internally includes a region adjusting part 346 and a mask control part 348. The functions of the region adjusting part 346 and the mask control part 348 are basically similar to those of the region adjusting part 120 and the mask control part 122 in the information processing device 10 according to the first embodiment. Specifically, when notified from the input information receiving section 332 that the user has performed a scaling operation on the client terminal 310, the region adjusting part 346 identifies an update region in a display region. The mask control part 348 synthesizes a mask image with a display image in which the update region is updated according to the scaling operation. For this purpose, the image generating section 344 decodes and decompresses the mask data 358 read from the storage section 334 as appropriate in timing before the scaling operation, and internally retains the mask data 358.

However, as compared with the first embodiment, the present embodiment involves processing of compression-coding the display image generated by the image generating section 344 and then transferring the display image to the client terminal 310 before the image is displayed on the client terminal 310. Therefore, a new effect of reducing the size of data to be transferred by updating the image such that the updating of the image is limited to the update region can be expected. When a moving image is compressed by ordinary inter-frame prediction, the smaller the differences between frames are, the more the data size after the compression can be reduced, of course. Hence, the data size can be reduced greatly by limiting changes according to scaling operation to the update region and using a still image in the other region.

In a case of a scrolling operation in which the display region is only translated in the image plane, the movement of the display region can be predicted with high accuracy by a motion vector generated at the time of compression. On the other hand, changes in the image according to scaling operation are difficult to express by a motion vector, and thus naturally result in a difference image carrying a large amount of information. As a result, compression efficiency is deteriorated, and the image quality of the display image using the compressed data is also degraded. Thus, a specific effect of scaling operation on compression-coded data can be minimized by limiting the region as an update object, and the image quality of the region being updated can be maintained by partly increasing a bit rate.

Also in this mode, as described with reference to FIG. 7 in the first embodiment, the higher the scaling speed, the smaller the size of the update region. Thus, even when the scaling speed is increased in a series of scaling operation periods, variations in size of compression-coded data and in turn an effect on the bit rate can be suppressed, so that stable transfer and display are made possible.

The encoding section 338 compression-codes the data of the display image supplied from the image generating section 344, and sequentially supplies the compression-coded data to the data transmitting section 340, irrespective of whether scaling operation is being performed or not. When only the update region is updated according to a scaling operation, the bit rate of the region is set higher than the bit rate of the other region, as described above. For this purpose, the encoding section 338 sequentially obtains information about the update region from the region adjusting part 346, and changes the distribution of bit rates to be set according to the information. The data transmitting section 340 sequentially transfers the compression-coded image data to the client terminal 310. An ordinary technology can be applied to concrete transfer processing.

The data receiving section 316 in the client terminal 310 receives the image data transmitted from the server 330. The decoding section 318 decodes and decompresses the received image data, and expands the image data as an image in an internal frame buffer. At this time, there may be different bit rates. Therefore, decoding conditions are changed as appropriate according to decoding parameter setting information included in the data.

The display section 320 displays the image expanded in the frame buffer on the display. Hence, the display section 320 includes ordinary displays such as a liquid crystal display, an organic EL (electroluminescence) display, a plasma display, and the like for displaying an image and a mechanism for controlling these devices. The display section 320 may further include audio output devices such as a speaker, earphones, headphones, and the like for outputting an audio signal as sound.

Figure 12:
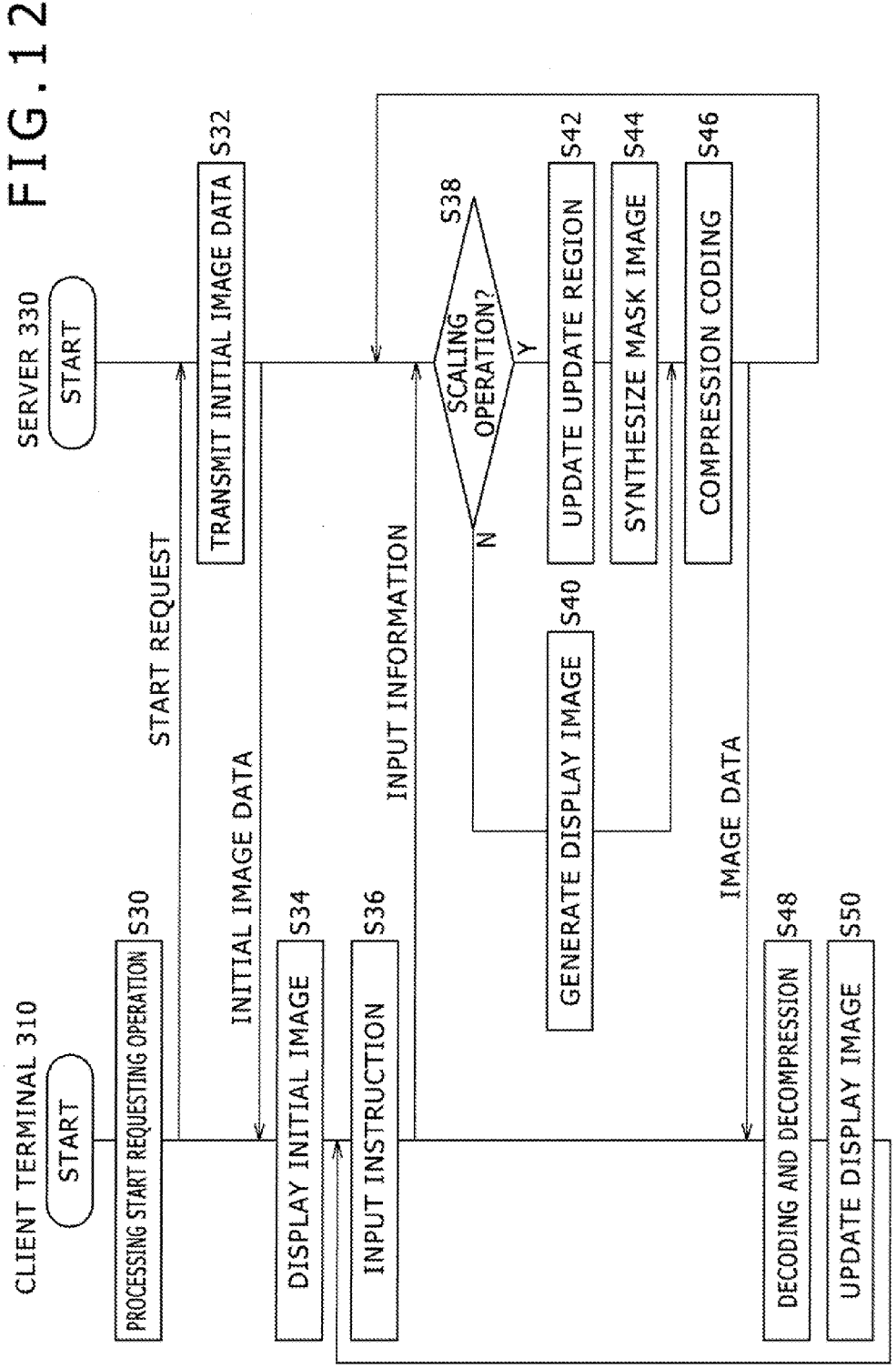
FIG. 12 is a flowchart of a process procedure in which the client terminal and the server in the present embodiment update a display image in the client terminal.

The operation of the system that can be realized by this configuration will next be described. FIG. 12 is a flowchart of a processing procedure in which the client terminal 310 and the server 330 update a display image in the client terminal 310. In FIG. 12, each process such as data generation, transmission, output, or the like is shown as one step, but may have a time width depending on details of the process. Suppose that in this case, processes progress in parallel with each other as appropriate.

First, when the user operates the input section 312 of the client terminal 310 to request a start of processing by for example specifying details of information processing or image data to be displayed (S30), the input information transmitting section 314 generates a signal for requesting the start of the processing, and transmits the signal to the server 330. After the input information receiving section 332 in the server 330 receives the processing start requesting signal, the data of an initial image generated and compression-coded by cooperation between the information processing section 336, the image generating section 344, and the encoding section 338 is transmitted to the client terminal 310 by the data transmitting section 340 (S32).

After the data receiving section 316 in the client terminal 310 receives the data of the initial image, the decoding section 318 decodes and decompresses the data, and then the display section 320 outputs the data, whereby the initial image is displayed on the client terminal 310 (S34). Incidentally, when the data of the initial image is the data of a moving image or the like which data has a temporal width, it suffices for the transmission processing in S32 to be stream transfer, and the client terminal 310 sequentially decodes and displays the received data.

Each time the user operates the input section 312 for a display region movement or the like while viewing the thus displayed initial image, the input information transmitting section 314 transmits corresponding input information to the server 330 (S36). When the user operation is not a scaling operation (N in S38), the information processing section 336 performs processing according to details of the operation, and the image generating section 344 generates a display image accordingly (S40). This processing is ordinary display image update processing such as moving the display region according to a scrolling operation, making a game screen progress, or the like.

When the user operation is a scaling operation (Y in S38), on the other hand, the image generating section 344 updates only the update region in the display region for one time step according to the scaling operation (S42), and then synthesizes a mask image (S44). Then, the encoding section 338 compression-codes the display image generated by the image generating section 344 irrespective of whether scaling processing is being performed (S46). However, at the time of scaling processing, a high bit rate is assigned to the update region, as described above.

When the data transmitting section 340 transmits the compression-coded data in each time step, the decoding section 318 in the client terminal 310 decodes and decompresses the data (S48). Then, the display section 320 outputs the data to the display, whereby an image changing according to the user operation is displayed on the client terminal 310 (S50). For example, at the time of the scaling operation, the data of a moving image in which only the update region is gradually scaled is generated. Thus, the server 330 sequentially performs stream transfer of the data. A mode in which the screen is updated as appropriate according to the user operation can be realized by repeating the processing from S36 to S50.

In the embodiment described above, the server 330 completes the final display image, compression-codes the display image, and transfers the compression-coded display image to the client terminal 310. The client terminal 310 can realize display by only decoding and decompression processing. Therefore, advanced image display can be made even when the client terminal 310 has a simple configuration. The effect of improving compression efficiency according to this form can be obtained sufficiently even when the focus of scaling operation is not at the center of the screen and the mask image changes throughout the screen.

Specifically, as described with reference to FIG. 8 in the first embodiment, when the focus of scaling operation moves within the screen, the cut-out region of the mask image to be synthesized is moved. This processing is in effect none other than the scrolling of the mask image. Changes between frames which changes are involved in the processing can be predicted by a motion vector. As a result, a high compression efficiency can be expected as compared with an image obtained by scaling the entire screen.

Figure 13:
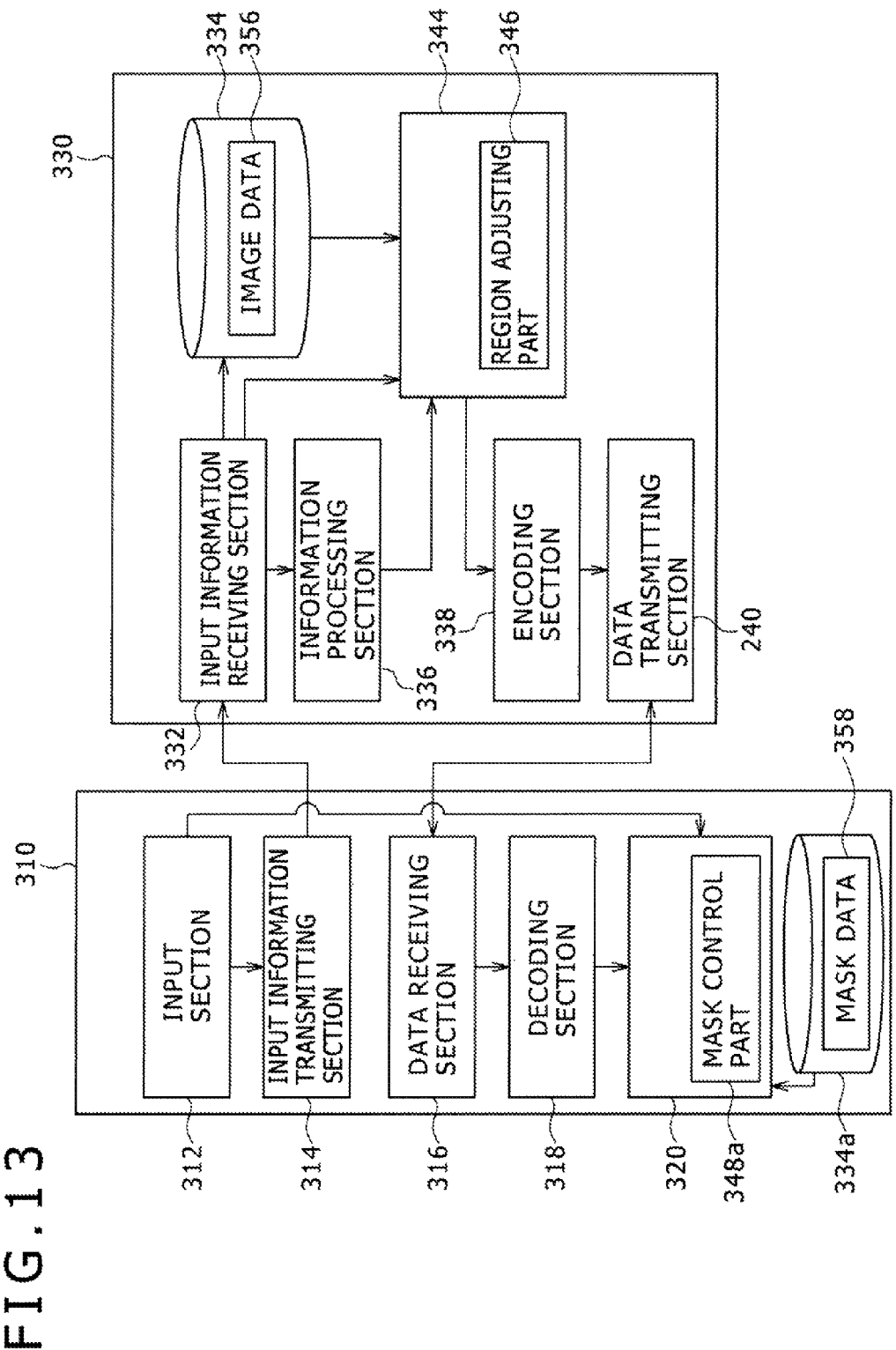
FIG. 13 is a diagram showing a functional configuration of a client terminal and a server in a case where mask image synthesis processing is performed on the side of the client terminal in the present embodiment.

On the other hand, mask image synthesis processing may be performed on the side of the client terminal 310. FIG. 13 shows functional configurations of a client terminal 310 and a server 330 in this case. The configurations of FIG. 13 are different from the configurations of FIG. 11 in that the client terminal 310 includes a storage section 334a for storing mask data 358 and includes a mask control part 348a in a display section 320. Of course, the server 330 does not need to have mask data nor a mask control part. The other configuration is the same as in FIG. 11, and therefore detailed description thereof will be omitted.

In this case, in response to a scaling operation, the server 330 omits mask image synthesis processing in S44 in FIG. 12, but compression-codes the data of an image in which the update region is updated according to the scaling operation and transfers the data to the client terminal 310. In the client terminal 310, the mask control part 348a uses the mask data 358 to synthesize a mask image with the image decoded and decompressed by a decoding section 318. For this purpose, an input section 312 in the client terminal 310 successively notifies the mask control part 348a of information necessary for synthesizing the mask image, such as a scaling operation amount, the focus of scaling, and the like, which information is determined according to details of the scaling operation.

With this configuration, it suffices for the server 330 to compression-code only the image before the mask image is synthesized, that is, the image in which only the update region includes differences from a previous frame, so that compression efficiency is further increased. In addition, in a mode in which the mask image is synthesized with the display image on the side of the client terminal 310 in timing in which the scaling operation is performed without waiting for the data from the server 330, good responsiveness to the scaling operation can be produced as in the foregoing first embodiment.

As an extension of such division, the client terminal 310 may be replaced with the information processing device 10 described in the first embodiment. That is, the client terminal 310 itself may be provided with a display image rendering function. In this case, a mode can be realized in which the client terminal 310 receives and displays the data of a display image from the server 330 only when the client terminal 310 does not retain the image data. In this case, the mask control part 348a provided in the client terminal 310 (or the mask control part 122 in the first embodiment) synthesizes the mask image with the display image and displays the result at the time of scaling operation irrespective of whether the display image is an image generated within the own device or an image transferred from the server 330. When the display image is transferred from the server 330, it suffices to compression-code and transmit the data of the display image before mask image synthesis as described with reference to FIG. 13. An operation similar to that of the first embodiment is performed when the display image is generated within the client terminal 310.

As a suitable example of a form in which a source from which data is read is thus changed according to whether or not the client terminal 310 retains the display object image data, a method of setting a link to a predetermined region within an image is considered. For example, when the display region enters a region set in advance while the client terminal 310 is displaying an image, the image data used for the display is changed. In order to realize such a mode, data is prepared in which a region as a trigger for changing image data and image data to which the image data is changed are set together with the data of the image itself. Hereinafter, such association between a plurality of pieces of image data will be referred to as a "link," changing image data according to the link will be referred to as the "execution of the link," and a region in an image which region serves as a trigger for the execution of the link will be referred to as a "link region."

Figure 14:
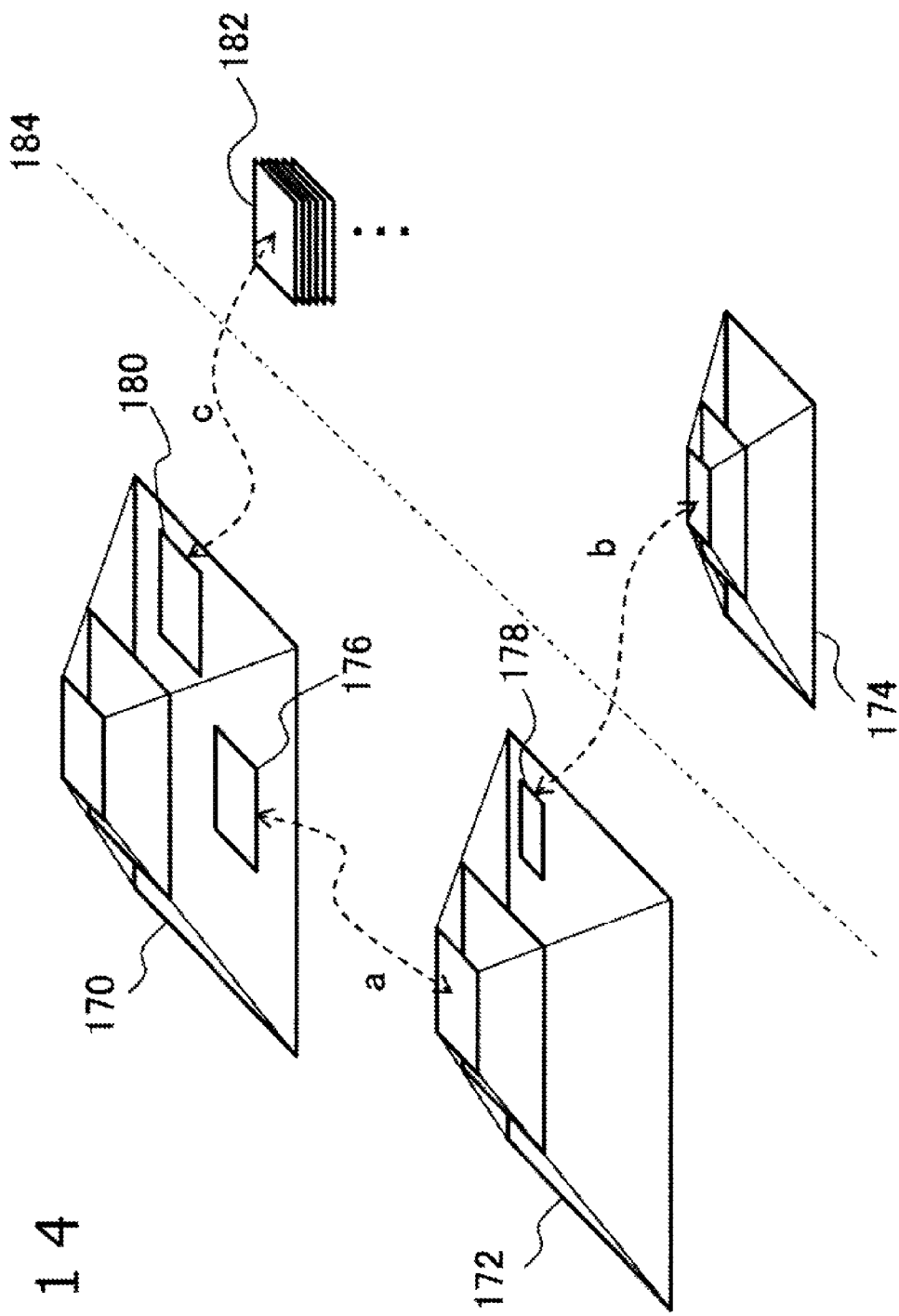
FIG. 14 is a diagram schematically showing a state in which links are set to a plurality of pieces of image data including hierarchical data in the present embodiment.

FIG. 14 schematically shows a state in which links are set to a plurality of pieces of image data including hierarchical data. In the example of FIG. 14, links are set to three pieces of hierarchical data 170, 172, and 174 and one piece of moving image data 182, and correspondences between link regions are indicated by dotted line arrows. For example, when the display region overlaps a link region 176 set in the second layer of the hierarchical data 170 while an image is displayed using the hierarchical data 170, a change is made to a display using the zeroth layer of another piece of hierarchical data 172 (link a). In this case, a link region as a link destination is an entire image in the zeroth layer of the hierarchical data 172.

With such settings, zooming in on the link region 176 and vicinities thereof in image display using the hierarchical data 170 first changes data used for rendering the image from the zeroth layer to the first layer and then to the second layer in the hierarchical data 170, and further changes the hierarchical data itself to the hierarchical data 172. As a result, an object within the link region 176 can be further enlarged.

Conversely, zooming out to the resolution of the zeroth layer of the hierarchical data 172 while an image is displayed using the hierarchical data 172 returns the image to the link region 176 of the previous hierarchical data 170. Similarly, when the display region overlaps a link region 178 set in the second layer of the hierarchical data 172 while the image is displayed using the hierarchical data 172, a change is made to a display using the zeroth layer of the hierarchical data 174 (link b). Then, zooming out to the resolution of the zeroth layer of the hierarchical data 174 returns the image to the link region 178 of the previous hierarchical data 172.

Objects represented by the plurality of pieces of hierarchical data to which the links are set may be an identical object, or may be totally different objects. In the latter case, a presentation in which another image world develops with a change of image data can be realized. Meanwhile, another link region 180 is set to the hierarchical data 170. The link destination of the link region 180 is the moving image data 182 (link c). For example, a title image of a corresponding moving image is embedded in the link region 180 as a link source, and zooming in on the region can execute the link and start the reproduction of the moving image.

Link destinations are not limited to hierarchical data and moving image data, but may be still image data not having a hierarchical structure, a plurality of pieces of still image data sequentially displayed by a slide show, audio data, and the like. In a case where a link destination is moving image data or audio data, a return may be made to an image as a link source when the user stops reproduction of the moving image data or the audio data or the reproduction of the moving image data or the audio data is completed. In a case where a link destination is another kind of data than image data that has been processed thus far, such as moving image data, audio data, or the like, not only is the data as processing object changed but also a function for reproducing and processing the data is started as appropriate.

The use of such a technology can realize a mode in which the client terminal 310 retains a part of a plurality of pieces of image data to which links are set, and the server 330 transfers the data of a display image as required as the display region is moved on the client terminal 310. This clarifies the distinction of data according to whether the data is retained by the client terminal 310 or not, while expanding an accessible range on a data network, under unified operability. Therefore, quality control and charging control are also facilitated.

For example, the hierarchical data 170 and 172 on the data network shown in FIG. 14 is stored in the storage section of the client terminal 310. Then, when link b or link c whose link destination is the image data not retained by the client terminal 310 is executed, the source from which the data is read is changed from the storage section of the client terminal 310 to the server 330. Alternate long and short dashed lines 184 in FIG. 14 indicate the boundary of the change. For the image data beyond the change boundary, as described above, input information in the client terminal 310 is transmitted to the server 330, and as a result of processing being performed on the side of the server 330 according to the input information, the data of a display image is transmitted to the client terminal 310.

The above-described technology has a major feature of seamlessly changing the source from which image data is read according to the movement of the display region. Hence, being able to respond to scaling operation at a same response speed at all times by synthesizing the mask image on the side of the client terminal 310 irrespective of the data readout source in the present embodiment is effective also from a viewpoint of an affinity for such a data readout source changing technology.

According to the present embodiment described above, in the system in which the server generates a display image according to a user operation on the client terminal, and the display image is displayed on the side of the client terminal, when a display image scaling operation is performed, the server updates the image such that the updating of the image is limited to only a partial region of the display image. An image immediately before the scaling operation is left as it is in the other region, or the other region is a filled-in region or the like. This limits a region including differences between frames until an image as an end point of the scaling operation is displayed, and thus increases compression efficiency. When the entire screen is changed by ordinary scaling processing, there are small amounts of components that can be represented by a motion vector as in the scrolling of the screen, so that compression efficiency is poor and also image quality is degraded. A disadvantage specific to the scaling operation can be minimized by limiting the update region as described above.

In addition, the server or the client terminal synthesizes a mask image of a concentration line or the like with the display image thus updated in a limited manner. It is thereby possible to conceal the region that is not updated, and present information desired by the user such for example as information indicating that scaling processing is being performed and indicating the focus of the scaling with good responsiveness, as described in the first embodiment. It is possible, in turn, to realize image display that is easy to view and simple by reducing an amount of information in a part to which the user is not paying attention.

The present technology has been described above on the basis of embodiments thereof. The foregoing embodiments are illustrative, and it is to be understood by those skilled in the art that combinations of constituent elements and processing processes of the embodiments are susceptible of various modifications and that such modifications also fall within the scope of the present technology.

The present disclosure contains subject matter related to that disclosed in Japanese Priority Patent Application JP 2013-131130 filed in the Japan Patent Office on Jun. 21, 2013, the entire content of which is hereby incorporated by reference.

What is claimed is:

1. An image processing device comprising:
an input information obtaining section configured to obtain user input information for changing, as a display object, a display region in an image;
a display image processing section configured to generate, as a display image, an image inside the display region determined on a basis of the user input information, where the display image processing section makes visibility different by synthesizing an image of a concentration line including a plurality of radial lines concentrating onto the region in a predetermined area range with the display image being scaled;
a display section configured to display, on a display, the generated display image; and
a storage section configured to store data of a template image of the concentration line, the template image having a size larger than a screen size of the display,
wherein when the input information obtaining section obtains user input information for scaling the display image, the display image processing section scales the display image according to the user input information, and during the scaling performs image manipulation making visibility of a region of the display image, the region being in the predetermined area range of the display image, the predetermined area range including an object of focus as a center of the scaling, different from visibility of another region of the display image,
wherein making visibility of the region different from visibility of the another region includes applying a masking effect to at least a part of the another region, the masking effect communicating to a viewer movement of the object of focus in a direction toward or away from a background behind the object of focus, and
wherein the display image processing section determines a region to be cut out from the template image such that the concentration line concentrates onto a position corresponding to the focus in the display image, and synthesizes the cut-out concentration line image.

2. The image processing device according to claim 1, wherein when scaling the display image, the display image processing section updates the display image in each time step such that the scaling of the image is performed so as to be limited to within the region in the predetermined area range.

3. An image processing system comprising:
a client terminal operated by a user; and
a server configured to obtain information about a user operation from the client terminal, generate data of a display image to be displayed on the client terminal according to the information, and transmit the data to the client terminal,
wherein the server includes:
an input information obtaining section configured to obtain user input information for changing, as a display object, a display region in an image from the client terminal, a display image processing section configured to generate, as the display image, an image inside the display region determined on a basis of the user input information, where the display image processing section makes visibility different by synthesizing an image of a concentration line including a plurality of radial lines concentrating onto the region in a predetermined area range with the display image being scaled,
an encoding section configured to compression-code data of the generated display image, and
a transmitting section configured to transmit the compression-coded data to the client terminal;
the client terminal includes:
a decoding section configured to decode and decompress the compression-coded data transmitted from the server,
a display section configured to display, on a display, a decoded and decompressed image,
a storage section configured to store data of a template image of the concentration line, the template image having a size larger than a screen size of the display,
wherein, in the server, when the input information obtaining section obtains user input information for scaling the display image, the display image processing section changes the display image such that the scaling of the image is performed, during the scaling, so as to be limited to a region of the display image, the region being in the predetermined area range of the display image, the predetermined area range including an object of focus as a center of the scaling,
wherein during the scaling a masking effect is applied, the masking effect communicating to a viewer movement of the object of focus in a direction toward or away from a background behind the object of focus, and
wherein the display image processing section determines a region to be cut out from the template image such that the concentration line concentrates onto a position corresponding to the focus in the display image, and synthesizes the cut-out concentration line image.

4. The image processing system according to claim 3, wherein the display section of the client terminal displays the display image being scaled on the display, the display image being transmitted from the server and decoded and decompressed by the decoding section, after the display image is subjected, during the scaling, to image manipulation making visibility of the region in the predetermined area range different from visibility of another region of the display image.

5. An image processing method for controlling an image displayed on a display by an image processing device, the image processing method comprising:
obtaining user input information for changing, as a display object, a display region in an image from an input device;
generating, as a display image, an image inside the display region determined on a basis of the user input information, and storing the display image in a memory, where the generating includes making visibility different by synthesizing an image of a concentration line including a plurality of radial lines concentrating onto the region in a predetermined area range with the display image being scaled; and reading the display image stored in the memory, displaying, on a display, the display image, and storing data of a template image of the concentration line, the template image having a size larger than a screen size of the display, wherein when user input information for scaling the display image is obtained in obtaining the user input information from the input device, the display image is scaled according to the user input information, and image manipulation making visibility of a region of the display image, the region being in the predetermined area range of the display image, the predetermined area range including an object of focus as a center of the scaling, different from visibility of another region of the display image, is performed during the scaling, and wherein making visibility of the region different from visibility of the another region includes applying a masking effect to at least a part of the another region, the masking effect communicating to a viewer movement of the object of focus in a direction toward or away from a background behind the object of focus, and wherein the displaying includes determining a region to be cut out from the template image such that the concentration line concentrates onto a position corresponding to the focus in the display image, and synthesizes the cut-out concentration line image.

6. An image processing method performed by a client terminal operated by a user, and a server for obtaining information about a user operation from the client terminal, generating data of a display image to be displayed on the client terminal according to the information, and transmitting the data to the client terminal, the image processing method comprising:

in the server,
obtaining user input information for changing, as a display object, a display region in an image from the client terminal;
generating, as a display image, an image inside the display region determined on a basis of the user input information, and storing the display image in a memory, where the generating includes making visibility different by synthesizing an image of a concentration line including a plurality of radial lines concentrating onto the region in a predetermined area range with the display image being scaled;
reading data of the generated display image from the memory, and compression-coding the data of the generated display image;
storing data of a template image of the concentration line, the template image having a size larger than a screen size of a display; and
transmitting the compression-coded data to the client terminal; and in the client terminal,
decoding and decompressing the compression-coded data transmitted from the server, and storing the data in a memory; and
reading a decoded and decompressed image from the memory, and displaying, on the display, the image, wherein when the server obtains user input information for scaling the display image in obtaining the user input information from the client terminal, the display image is changed such that the scaling of the image is performed, during the scaling, so as to be limited to a region of the display image, the region being in the predetermined area range of the display image, the predetermined area range including an object of focus as a center of the scaling, wherein during the scaling a masking effect is applied, the masking effect communicating to a viewer movement of the object of focus in a direction toward or away from a background behind the object of focus, and wherein the displaying includes determining a region to be cut out from the template image such that the concentration line concentrates onto a position corresponding to the focus in the display image, and synthesizes the cut-out concentration line image.

7. A non-transitory computer-readable medium encoded with a computer program which when executed by a computer, causes the computer to carry out actions, comprising:

obtaining user input information for changing, as a display object, a display region in an image from an input device;
generating, as a display image, an image inside the display region determined on a basis of the user input information, and storing the display image in a memory, where the generating includes making visibility different by synthesizing an image of a concentration line including a plurality of radial lines concentrating onto the region in a predetermined area range with the display image being scaled; and
reading the display image stored in the memory,
displaying, on a display, the display image, and
storing data of a template image of the concentration line, the template image having a size larger than a screen size of the display, wherein when user input information for scaling the display image is obtained in obtaining the user input information from the input device, the display image is scaled according to the user input information, and image manipulation making visibility of a region of the display image, the region being in the predetermined area range of the display image, the predetermined area range including an object of focus as a center of the scaling, different from visibility of another region of the display image, is performed during the scaling, and wherein making visibility of the region different from visibility of the another region includes applying a masking effect to at least a part of the another region, the masking effect communicating to a viewer movement of the object of focus in a direction toward or away from a background behind the object of focus, and wherein the displaying includes determining a region to be cut out from the template image such that the concentration line concentrates onto a position corresponding to the focus in the display image, and synthesizes the cut-out concentration line image.

8. A non-transitory computer-readable medium encoded with a computer program, which when executed by a server for obtaining information about a user operation from a client terminal connected via a network, generating data of a display image to be displayed on the client terminal according to the information, and transmitting the data to the client terminal, causes the server to carry out actions, comprising:

obtaining user input information for changing, as a display object, a display region in an image from the client terminal;

generating, as a display image, an image inside the display region determined on a basis of the user input information;

compression-coding data of the generated display image; and transmitting the compression-coded data to the client terminal, and storing data of a template image of a concentration line, the template image having a size larger than a screen size of a display, where a display image processing section makes visibility different by synthesizing an image of the concentration line including a plurality of radial lines concentrating onto the region in a predetermined area range with the display image being scaled, wherein when a function of obtaining the user input information from the client terminal obtains user input information for scaling the display image, a function of generating the image as the display image changes the display image such that the scaling of the image is performed, during the scaling, so as to be limited to a region of the display image, the region being in the predetermined area range including an object of focus as a center of the scaling, wherein during the scaling a masking effect is applied, the masking effect communicating to a viewer movement of the object of focus in a direction toward or away from a background behind the object of focus, wherein the displaying includes determining a region to be cut out from the template image such that the concentration line concentrates onto a position corresponding to the focus in the display image, and synthesizes the cut-out concentration line image.

* * * * *